United States Patent
Jacques et al.

(10) Patent No.: US 7,738,266 B2
(45) Date of Patent: Jun. 15, 2010

(54) FORWARD POWER CONVERTER CONTROLLERS

(75) Inventors: Russell Jacques, Withersfield (GB); David Robert Coulson, Comberton (GB)

(73) Assignee: Cambridge Semiconductor Limited, Cambridge (GB)

( * ) Notice: Subject to any disclaimer, the term of this patent is extended or adjusted under 35 U.S.C. 154(b) by 508 days.

(21) Appl. No.: 11/639,827

(22) Filed: Dec. 15, 2006

(65) Prior Publication Data

US 2008/0037293 A1    Feb. 14, 2008

Related U.S. Application Data

(63) Continuation-in-part of application No. 11/449,486, filed on Jun. 8, 2006.

(30) Foreign Application Priority Data

May 26, 2006    (GB) .................................. 0610422

(51) Int. Cl.
 *H02M 3/335*    (2006.01)
(52) U.S. Cl. ............... 363/21.02; 363/21.03; 363/21.07
(58) Field of Classification Search .................. 363/16, 363/21.03, 21.08, 21.1, 21.04, 21.07, 21.09, 363/21.02
See application file for complete search history.

(56) References Cited

U.S. PATENT DOCUMENTS

| | | | |
|---|---|---|---|
| 4,415,959 A | 11/1983 | Vinciarelli | |
| 4,788,634 A | 11/1988 | Schlecht et al. | |
| 4,866,367 A | 9/1989 | Ridley et al. | |
| 4,928,220 A | 5/1990 | White | |
| 5,317,499 A | 5/1994 | Brakus | |
| 5,377,091 A  * | 12/1994 | Faulk | ....................... 363/21.16 |

(Continued)

FOREIGN PATENT DOCUMENTS

EP    0055064 A2    12/1981

(Continued)

OTHER PUBLICATIONS

Shukla J et al: "A novel active resonant snubber for single switch unity power factor three-phase diode rectifiers" Power Electronics Specialists Conference, 2004. PESC 04. 2004 IEEE $35^{th}$ Annual Aachen, Germany, Jun. 20-25, 2004, Piscataway, NJ, USA, IEEE, US, Jun. 20, 2004, pp. 3818-3823vol. 5, XP010738323 ISBN: 0-7903-8399-0 paragraph [Introduction]; figure 1.

(Continued)

*Primary Examiner*—Jessica Han
*Assistant Examiner*—Emily Pham

(57) ABSTRACT

This invention relates to control techniques and controllers for resonant discontinuous forward power converters (RD-FCs). We describe a controller for a resonant discontinuous forward converter (RDFC), said forward converter including a transformer with first and second matched polarity windings and a switch to switch dc power to said first winding of said transformer, said converter further having a dc output coupled to said second winding of said transformer, and wherein said controller has two modes, a first operational mode during which said switch is controlled to switch said dc power at a frequency which substantially coincides with a resonant frequency of operation of said RDFC such that said RDFC supplies power from said dc output, and a second, reduced power operational mode during which a drive to said switch is controlled to increase a proportion of time during which said switch is off.

16 Claims, 16 Drawing Sheets

U.S. PATENT DOCUMENTS

| | | | |
|---|---|---|---|
| 5,608,613 A | | 3/1997 | Jansen |
| 5,754,414 A * | | 5/1998 | Hanington ............... 363/21.12 |
| 6,341,074 B2 * | | 1/2002 | Yamaguchi ............... 363/21.04 |
| 6,577,511 B2 * | | 6/2003 | Yamaguchi et al. ...... 363/21.07 |
| 6,665,197 B2 * | | 12/2003 | Gong et al. .............. 363/21.01 |
| 6,687,137 B1 | | 2/2004 | Yasumura |
| 6,813,170 B2 * | | 11/2004 | Yang ....................... 363/56.09 |
| 6,934,167 B2 * | | 8/2005 | Jang et al. ................ 363/21.02 |
| 7,019,988 B2 * | | 3/2006 | Fung et al. ............... 363/21.01 |
| 2005/0152160 A1 * | | 7/2005 | Fung et al. ..................... 363/18 |

FOREIGN PATENT DOCUMENTS

| | | |
|---|---|---|
| EP | 0 055 064 A2 | 6/1982 |
| EP | 0 074 399 | 8/1988 |
| EP | 0 658 968 A1 | 6/1995 |
| EP | 1 156 580 | 11/2001 |
| EP | 1 432 108 A1 | 6/2004 |
| EP | 1 508 961 | 2/2005 |
| GB | 2 151 822 A | 7/1985 |
| JP | 05292741 A | 5/1993 |
| JP | 09182424 A | 7/1997 |
| JP | 2002345236 A | 11/2002 |

OTHER PUBLICATIONS

Search Report Under Section 17 for corresponding British application No. GB0706132.8; claims searched 1-27; Date of Search Jun. 1, 2007 (copy attached).

International Search Report for corresponding PCT/GB2007/050276, completed Sep. 1, 2008 by M. Marannino.

UK Search Report for corresponding GB0811374.8 completed Sep. 30, 2008 by Robert Barrell.

UK Search Report for corresponding GB0811279.9 completed Oct. 2, 2008 by Robert Barrell.

EPODOC/EPO JP529741, Feb. 10, 2008.

EPODOC/EPO JP918424, Feb. 10, 2008.

EPODOC/EPO JP2002345236, Sep. 29, 2008.

* cited by examiner

FORWARD POWER CONVERTER CONTROLLERS

RELATED APPLICATIONS

This application is a continuation-in-part of U.S. application Ser. No. 11/449,486, filed Jun. 8, 2006, which claims priority from British Patent Application No. GB0610422.8, filed May 26, 2006, the subject matter of which is incorporated herein by reference.

FIELD OF THE INVENTION

This invention relates to control techniques and controllers for resonant discontinuous forward power converters (RDFCs).

BACKGROUND TO THE INVENTION

FIG. 1 (which is taken from U.S. Pat. No. 4,688,160) shows an example of a forward power converter comprising a dc input 101, 102 coupled to the primary winding 109 of a transformer 110. The primary winding 109 is connected in series with a switching device 105, here a bipolar transistor, which switches on and off, during an on period building up magnetising flux in the primary winding 109, which drives a current in a secondary winding 111 of the transformer. Unlike a so-called flyback converter, in a forward converter the primary and secondary windings have matched polarities, as indicated by the dots on the windings in FIG. 1. The output from the transformer 110 is rectified by a rectifier 114 and smoothed by a smoothing capacitor 119 to provide a dc output 121, 122. When switch 105 is off the core of the transformer is "reset" allowing the magnetising flux to return to its initial state. In the example of FIG. 1 (U.S. Pat. No. 4,688,160) this is performed by resonant action between the magnetising inductance of transformer 110 and a capacitor 113 shunting diode 114, returning energy to the input voltage source.

The circuit of FIG. 1 includes a large output choke 117 between rectifier 114 and smoothing capacitor 119, and a freewheeling or "flyback" diode 115 across the series combination of choke 117 and smoothing capacitor 119. This is because when the switch 105 is turned off, because the primary and secondary windings have the same sense, rectifier 114 immediately becomes non-conducting. The function of the freewheeling diode 115 is to allow the choke 117 to maintain a continuous output current into output node "X" when switch 105 is off by providing a path for this current.

FIG. 1 shows a conventional, continuous forward converter. There are many other prior art documents describing such converters, including, for example, U.S. Pat. Nos. 4,415,959; 6,760,236; 6,304,463; 6,252,781; EP0 074 399; and the reference design SLUA276 for the Texas Instruments UCC38C42. In some of these later circuits the secondary side diodes are replaced by synchronous rectifiers embodied in MOS transistors. Other background prior art can be found in U.S. Pat. No. 4,788,634 which describes a resonant forward converter in which natural self-inductance of the transformer in parallel with the transformer provides a resonant "ring" so that the switching circuit can be self-resonant; and U.S. 2005/0270809 (WO 2004/057745) which describes use of an auxiliary transformer in a current limiting circuit.

We have previously described, in our earlier patent applications GB0610422.8 filed 26 May 2006 and U.S. Ser. No. 11/449,486 filed 8 Jun. 2006, how improved operation such as improved regulation and start-up may be achieved by use of switch control in a discontinuous current flow mode. More particularly we have previously described an RDFC for converting an input dc voltage to an output dc voltage, the converter comprising: first and second dc inputs; a transformer having primary and secondary windings with matched polarities; a controllable switch for switching power from the dc inputs through the primary winding of the transformer, the controllable switch and the primary winding of the transformer being coupled in series between the first and second dc voltage inputs; first and second dc voltage outputs; a rectifier coupled to the secondary winding of the transformer, the rectifier and the secondary winding of the transformer being coupled in series between the first and second dc voltage outputs; a smoothing capacitor having a first connection coupled to receive dc power from the rectifier at a first connection node, the first connection node being coupled to the first dc voltage output, the smoothing capacitor having a second connection coupled to the second dc voltage output; and a controller having an output coupled to the controllable switch and being configured to control the switch such that a voltage waveform on the secondary winding has a first portion during which the switch is on and current flows into the first connection node, and second substantially resonant portion during which the switch, and preferably also the rectifier, is off; and wherein substantially no current flows into the first connection node during the second portion of the voltage waveform.

We now describe further control techniques for RDFCs.

SUMMARY OF THE INVENTION

According to a first aspect of the invention there is therefore provided a controller for a resonant discontinuous forward converter (RDFC), said forward converter including a transformer with first and second matched polarity windings and a switch to switch dc power to said first winding of said transformer, said converter further having a dc output coupled to said second winding of said transformer, and wherein said controller has two modes, a first operational mode during which said switch is controlled to switch said dc power at a frequency which substantially coincides with a resonant frequency of operation of said RDFC such that said RDFC supplies power from said dc output, and a second, reduced power operational mode during which a drive to said switch is controlled to increase a proportion of time during which said switch is off.

In some preferred embodiments the switch drive comprises a pulse and the pulse width (on duration) is reduced in the second, reduced power operational mode. Additionally or alternatively in the reduced power operational mode one or more resonant frequency cycles of the switch is skipped. In this latter case, when the switch is next turned on, to further increase the efficiency of the RDFC the turn-on is timed to substantially coincide with a turning point, more particularly a valley in a resonant waveform of the RDFC.

In some preferred embodiments the controller is configured to automatically sense a reduced load condition and to select a second, reduced power operational mode in response to this. For example the controller may sense a reduced load condition by sensing a power supply to the controller, where the controller is embodied in an integrated circuit, a voltage supply to the IC. Additionally or alternatively the controller may select the reduced power mode by sensing a timing of operation of the RDFC, more particularly detection of more than one resonance during a period when the power switch is off (more than one cycle of ringing). Further options for identifying the reduced load condition include sensing on an output side of the RDFC (for example using a current-sensing resistor on the output side of the forward converter) and sensing by means of an auxiliary winding on the transformer.

In some particularly preferred embodiments the controller is configured to control the drive to the switch so that the switch turns on only when a voltage across the switch is at approximately 0V. (In embodiments the voltage across the switch may never actually be 0V because, for example, there may be a diode drop involved); this is especially useful.

In some preferred embodiments the second, reduced power operational mode comprises a stand-by mode of the RDFC.

According to another aspect of the invention there is provided a controller for a mains-powered resonant discontinuous forward converter (RDFC), said forward converter including a transformer with first and second matched polarity windings and a switch to switch dc power to said first winding of said transformer, said converter further having a dc output coupled to said second winding of said transformer, and wherein said dc power to said first winding is derived from a mains power supply and comprises an element of mains ripple, said controller comprising: a ripple sense input to sense said mains ripple; and a timing control module coupled to said ripple sense input and having an output to control a drive signal to said switch, said drive signal comprising a pulse having a pulse on period for driving said switch on and a pulse off period for driving said switch off; and wherein said timing control module is configured to vary one or both of a width and a frequency of said pulse in response to said sensed mains ripple to suppress a component of said ripple in said dc output.

The ripple sense input may sense the domestic or grid mains ripple at a number of points including, but not limited to, the dc output of the RDFC, the switch, and from an auxiliary winding on the transformer of the RDFC. Preferably the controller also includes a further sense input for regulating the dc output of the converter. Preferably the timing control module output comprises first and second output lines for, respectively, controlling the switch on and off; the controller preferably then further. comprises a switch control module responsive to these output lines to control the switch on an off.

In a related aspect the invention provides a method of suppressing ripple in a mains-powered resonant discontinuous forward converter (RDFC), said forward converter including a transformer with first and second matched polarity windings and a switch to switch dc power to said first winding of said transformer, said converter further having a dc output coupled to said second winding of said transformer, the method comprising: sensing an element of mains ripple in a signal of said RDFC; and controlling one or both of a pulse width and a pulse frequency of a drive signal to said switch to suppress said ripple.

In a further aspect the invention provides a controller for a resonant discontinuous forward converter (RDFC), said RDFC including a transformer and a power switch to switch dc power to said transformer, wherein said controller is configured to limit a current in said switch during start-up of said RDFC.

In embodiments where the switch comprises a transistor, in particular a bipolar transistor, the current limiting may comprise operating the transistor in a non-linear region. Additionally or alternatively the controller may be configured to increase a frequency of a control signal to the switch during start-up to limit the current at this time. The frequency may be increased above a normal operating frequency by a factor of, for example, 2, 5, 10 or more. Thus in embodiments the controller may be configured to control the RDFC so that it is non-resonant at start-up. The start-up frequency may either comprise a fixed frequency or a frequency dependent upon a signal sensed from the RDFC.

In a further aspect the invention provides a controller for a resonant discontinuous forward converter (RDFC), said RDFC including a transformer and a power switch to switch dc power to said transformer wherein said switch is configured to switch power to a winding of said transformer, wherein said controller comprises a system to sense a voltage in said winding of said transformer and to control said switch to turn partially on in response to said sensing.

In embodiments the transformer comprises an input winding and an output winding, the switch being configured to switch power to the input winding of the transformer. At a node on the input winding to which the switch is connected a sharp voltage rise can occur when the switch is turned off (in general the responses on the input and output winding sides of the transformer are not identical), and this voltage overshoot can be controlled and limited by turning the switch partially on, in effect sensing and catching the overshoot.

Thus in a further aspect the invention provides a method of controlling a resonant discontinuous forward converter (RDFC), said RDFC including a transformer and a power switch to switch dc power to said transformer, the method comprising sensing a voltage on said winding of said transformer and controlling said switch to turn partially on in response to said sensing to limit voltage overshoot.

In a still further aspect the invention provides a method of current limiting in a resonant discontinuous forward converter, said forward converter including a transformer with first and second matched polarity windings and a switch to switch dc power to said first winding of said transformer, said converter further having a dc output coupled to said second winding of said transformer, the method comprising detecting a current limit condition; and increasing a frequency of a control signal to said switch responsive to said detection.

In a related aspect the invention provides a controller for a resonant discontinuous forward converter (RDFC), said forward converter including a transformer with first and second matched polarity windings and a switch to switch dc power to said first winding of said transformer, said converter further having a dc output coupled to said second winding of said transformer, the controller comprising: means for detecting a current limit condition; and means for increasing a frequency of a control signal to said switch responsive to said detection.

The invention still further provides a controller for a resonant discontinuous forward converter (RDFC), the controller having one or more inputs to sense one or more signals from said resonant discontinuous forward converter, the controller further comprising a system for analysing said one or more sensed signals to determine turn-on and turn-off times for a power switch of said RDFC, and an output to provide a drive signal for said switch in accordance with said determined turn-on and turn-off times.

In a further related aspect the invention provides a method of controlling a resonant discontinuous forward converter, said forward converter including a transformer with first and second matched polarity windings and a switch to switch dc power to said first winding of said transformer, said converter further having a dc output coupled to said second winding of said transformer, the method comprising using a controller having one or more inputs to sense one or more signals from said resonant discontinuous forward converter and to analyse said one or more sensed signals to determine turn-on and turn-off times for said switch, and to provide a drive signal for said switch in accordance with said determined turn-on and turn-off times.

In a still further aspect the invention provides a method of operating a resonant discontinuous forward converter such that said resonant discontinuous forward converter has reduced sensitivity to tolerances of one or more resonant components of said resonant discontinuous forward converter, the method comprising driving a power switch of said resonant discontinuous forward converter using a free-running oscillator in which one or both of a substantially fixed frequency and a duty cycle of said oscillator are selected such that said switch is turned on when substantially zero volts is across said switch.

In this way in embodiments the RDFC can be configured to operate in a substantially zero voltage switching mode for a range of different (resonant) component values. This facilitates reduced cost commercial implementation of a practical RDFC power supply with a low component count and hence potentially low cost whilst nonetheless, in embodiments, ensuring efficient operation by tuning out variations in (primary) magnetising inductance and resonant capacitor(s).

Thus in a related aspect there is further provided a controller for controlling a resonant discontinuous forward converter such that said resonant discontinuous forward converter has reduced sensitivity to tolerances of one or more resonant components of said resonant discontinuous forward converter, said controller comprising a free-running oscillator for driving a power switch of said resonant discontinuous forward converter; and wherein one or both of a substantially fixed frequency and a duty cycle of said oscillator are selected such that said switch is turned on when substantially zero volts is across said switch.

In a still further aspect the invention provides a controller for a resonant discontinuous forward converter, said forward converter including a transformer with first or input or second or output matched polarity windings and a switch to switch dc power to said first winding of said transformer, said converter further having a dc output coupled to said second winding of said transformer, said controller being configured to control said forward converter to operate in a controlled oscillation mode in which said converter has an operational cycle including a first, on portion, in which current flows in both said first and second windings of said transformer and a second, off portion in which a substantially resonant voltage waveform is present at a connection between said first winding of said transformer and said switch, and wherein said controller has at least one sense signal input to sense a signal from said resonant discontinuous forward converter and an output to control said switch responsive to said sensed signal to operate said forward converter in said controlled oscillation mode.

In preferred embodiments the sensed signal is responsive to a level of energy in the transformer. Preferably the controller is implemented using a switch control module with first and second switch control input to receive separate respective switch-on and switch-off control signals. Preferably one of these is driven by a comparator comparing the sensed signal with a reference; preferably the other is also driven by the comparator output, but is delayed, in particular by a variable pulse width timer. In this way the switch can be controlled on when, say, a voltage sensed on said switch reaches a reference voltage and controlled off a predetermined or variable time later. In some preferred embodiments the switch-off control signal is also gated with an over-current protection signal so that when an over-current condition is detected the switch can be controlled off immediately. In other arrangements the switching on and switching off of the switch can be controlled separately; alternatively each of the switching on and switching off of the switch may be controlled by sensing a voltage and/or current on the input side of the RDFC.

In embodiments the switch is switched on at a time interval (which may be a fixed time interval, or which may be zero) after the voltage on the switch reaches substantially zero; and/or in response to a current sense signal (voltage) sensing a current though the first (input) winding of the transformer. In embodiments the switch is switched off after a fixed or variable on time; and/or in response to a sensed voltage and/or current in the input side of the RDFC. In embodiments the controller may respond to more than one signal sensed from the RDFC. In embodiments the RDFC lacks a capacitor in parallel with the output side rectifier; instead the RDFC is configured to achieve resonance without any capacitance additional to the intrinsic parasitic capacitance associated with the rectifier.

The RDFC may be incorporated into a mains power supply. In such embodiments a high dc voltage may be derived directly from the grid mains, for example by means of a bridge rectifier, this providing an input to the RDFC, which is configured to generate a much lower dc output voltage, for example less than 50V, 40V, 30V, 20V or 10V.

In some preferred embodiments of the above-described aspect of the invention the controller is implemented at a single-chip integrated circuit, optionally including the power switch.

A controller as described above may be implemented in either analogue or digital circuitry. Thus, where the controller is implemented mainly or wholly in digital circuitry the invention further provides a carrier medium carrying processor control code such as RTL (Register Transfer Level) or SystemC defining hardware to implement the controller.

According to a further aspect of the invention there is provided a forward power converter, the power converter comprising: an input; a transformer having a primary and a secondary winding; a power switch configured to switch power from said input across said primary winding; an output coupled to said secondary winding; and a control system, the control system having a sense input and being configured to control a timing of switching of said switch to regulate power output from said forward converter responsive to a sense signal from said sense input; and wherein said sense input is connected to receive said sense signal from a primary side of the forward converter.

The sense signal providing an input to the control system may comprise a voltage and/or a current sense signal. The control system may regulate an output voltage and/or an output current of the forward power converter.

The invention also provides a controller for a primary-side sensing forward power converter, in particular as described above.

The skilled person will understand that a discontinuous resonant forward converter as described above may be implemented using a range of circuit topologies including, but not limited to, those described later. The transformer, for example, may comprise an auto-transformer.

BRIEF DESCRIPTION OF THE DRAWINGS

These and other aspects of the invention will now be further described, by way of example only, with reference to the accompanying figures in which:

FIGS. 2a and 2b show, respectively, a discontinuous resonant forward converter according to our design, and an example timing and control arrangement for the converter of FIG. 2a;

DETAILED DESCRIPTION OF PREFERRED EMBODIMENTS

Figure 1:
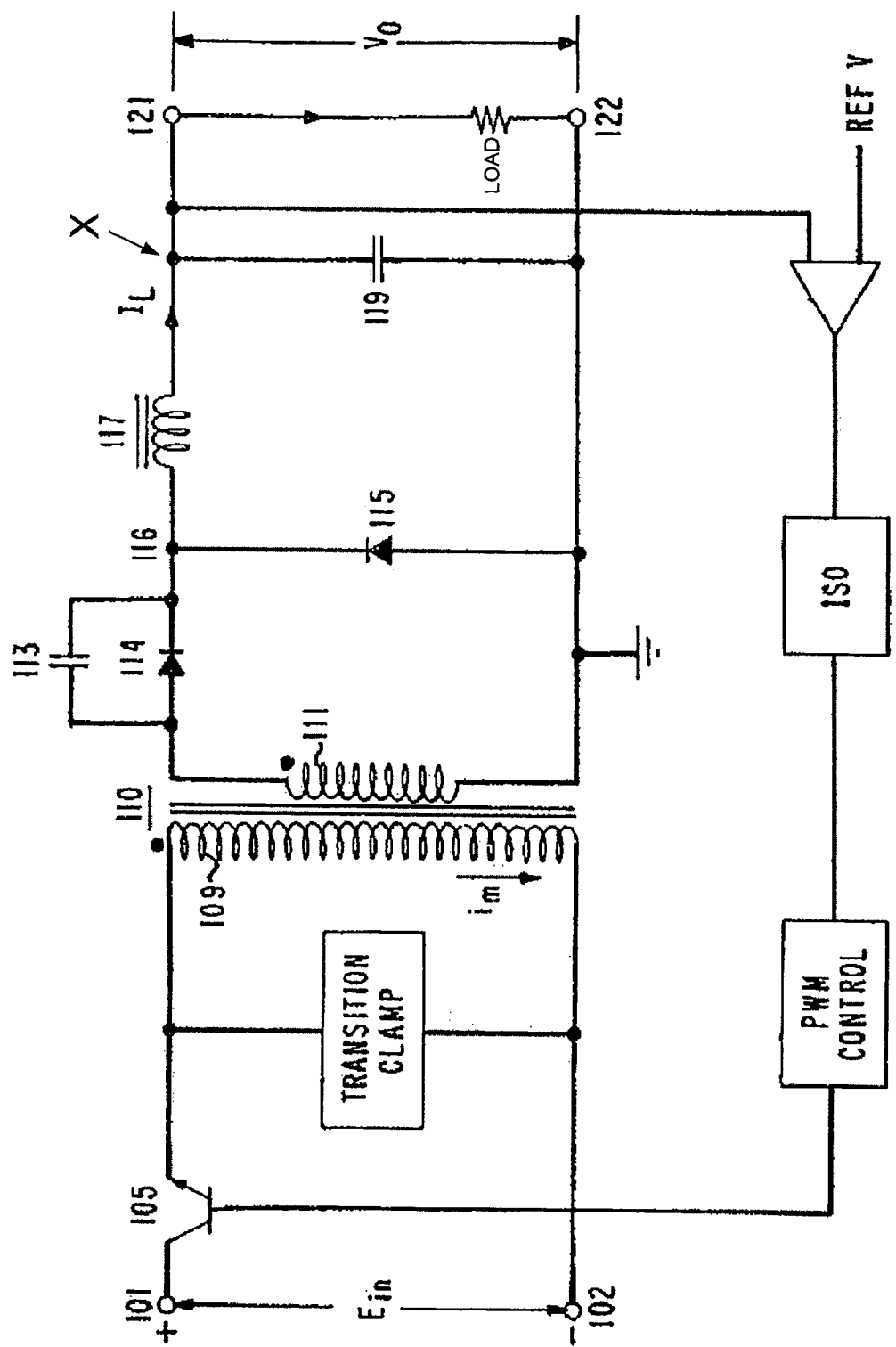
FIG. 1 shows an example of a forward converter according to the prior art.

In this specification we are concerned with controlling resonant discontinuous forward converters. In an exemplary RDFC power to a primary or input winding of a transformer is switched and a secondary or output winding of the transformer, with a polarity matched to that of the primary winding, is coupled to a rectifier which provides dc power to a smoothing capacitor, dc power being supplied to the RDFC output from this connection node. A voltage waveform on the secondary winding of the transformer has a first portion during which the switch is on current flows into the connection node, and second substantially resonant portion during which both the switch and the rectifier are off. Substantially no current flows into the connection node (other than from the smoothing capacitor) during the second portion of the voltage waveform.

In the designs we describe a connection between the rectifier and the connection node may include a small inductor (for example less than 5% of the primary side magnetising inductance) but substantially no current flows in this inductance during the second, resonant portion of the waveform and there is no need for a large choke of the type used in a continuous forward converter. There is no need connect a capacitor across the rectifier to achieve resonance; in embodiments we resonate substantially only across the switch rather than also across the secondary diode. More particularly in embodiments we use the magnetising inductance of the transformer with an added capacitor on the primary side to achieve resonance in the off cycle.

In some preferred implementations the RDFC is configured for AC-DC power conversion and thus includes an AC-DC converter such as a bridge rectifier on the primary side. In some particularly preferred implementations the RDFC is mains-powered and the primary side is powered by a high dc voltage (for example greater than 70 Vdc, 100 Vdc, 150 Vdc or 200 Vdc) whilst the secondary side dc voltage is low (for example, less than 20 Vdc or 10 Vdc). In embodiments we employ zero voltage switching on the primary side (i.e. a primary side switch is turned on at a time when a voltage across the switch is close to zero volts), but we ignore the secondary diode losses on switching.

We have previously described techniques for implementing a resonant discontinuous forward converter (RDFC) which employ a control system to turn a power switch of the RDFC on and off in a controlled manner. As previously described, the control system may operate in an uncontrolled, fixed frequency mode or the control system may sense from one or more inputs and decide when to turn the power switch on and off responsive to this sensing, for example to implement pulse width and/or frequency modulation. This facilitates regulation of the RDFC which, in detail, may be performed using a range of algorithms. One technique uses the control system to operate the RDFC to compensate for circuit variables and to operate in a zero voltage switching (ZVS) mode. The converter may also control the switching frequency during start-up and/or current limit in order to protect the power switch and increase the energy transferred to the load. The control system is preferably implemented using a control IC (integrated circuit).

As mentioned above, the RDFC operates without a freewheeling or flyback diode, and with or without an output inductor. However, if present the output inductor is sufficiently small to ensure that the forward converter operates in a discontinuous mode and substantially resonantly that is at or close to resonance.

Figure 2A:
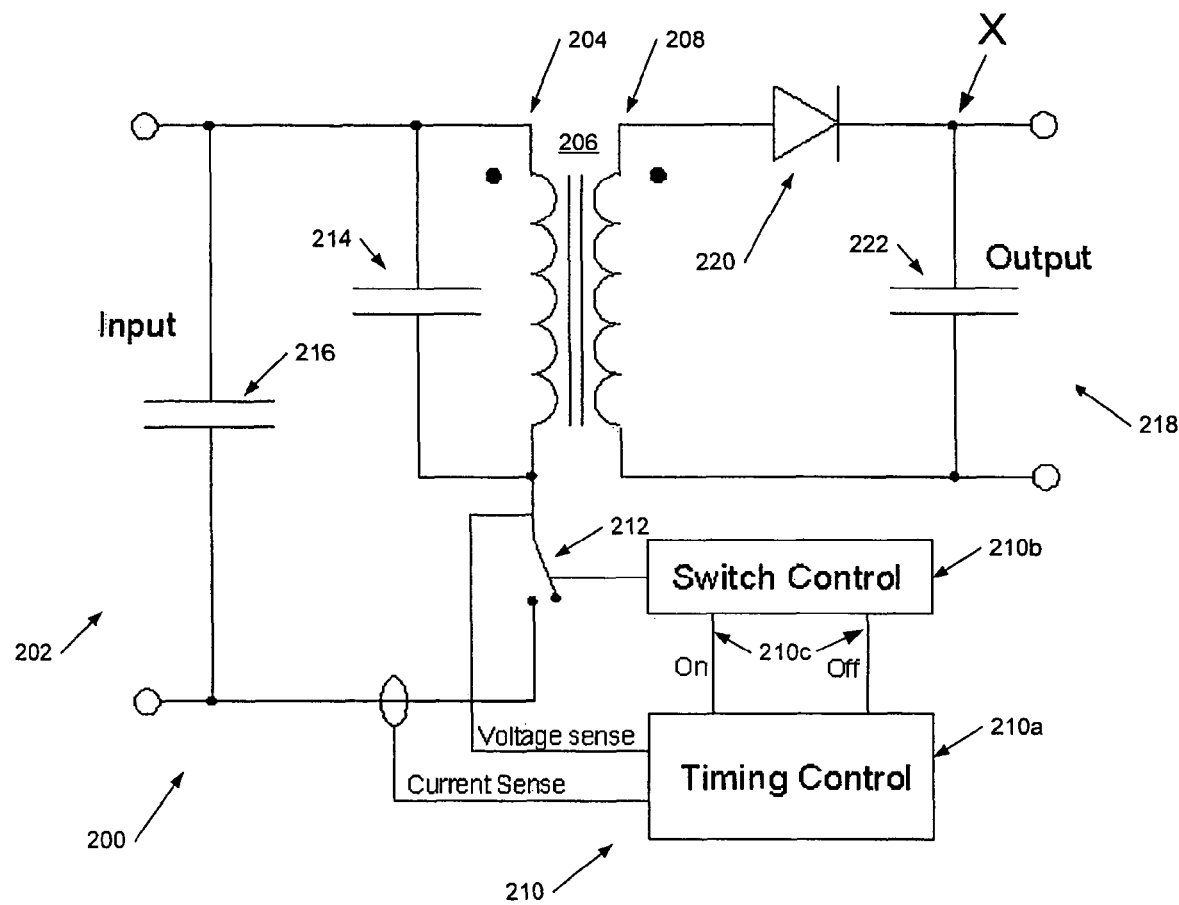
Figure 2B:
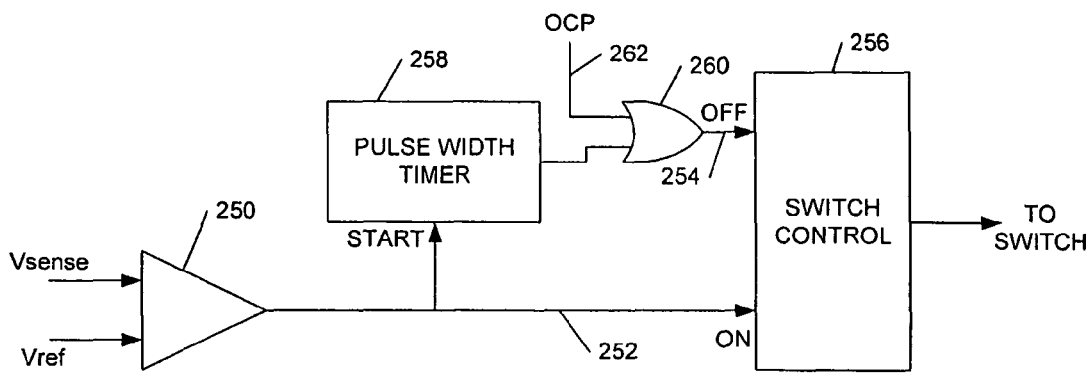

Referring now to FIG. 2a, this shows an example of discontinuous resonant forward converter 200 according to our design. FIG. 2b shows an example timing and control system 210 for the forward converter of FIG. 2a.

Referring to FIG. 2a, this shows a fully resonant discontinuous mode forward converter 200 with a dc input 202 coupled to the primary winding 204 of a transformer 206, connected in series with a power switch 212. A resonant capacitor 214 is connected across the primary winding of the transformer and the dc input 202 is provided with a smoothing capacitor 216. On the output side of the forward converter a secondary winding 208 of the transformer provides power to a pair of dc output terminals 218 via a rectifier 220. A smoothing capacitor 222 is connected across the dc output terminals 218 and an output node at the junction of rectifier 220, smoothing capacitor 222 and a connection to one of the dc output terminals 218 is denoted "X". The current into node X, which flows to either or both of the smoothing capacitor 222 and output 218, is discontinuous, by contrast with the circuit shown in FIG. 1.

The switch 212 may comprise a bipolar or MOS transistor such as a MOSFET or IGBT, or some other device. The rectifier 220 may be implemented as a diode or by means of a MOS transistor. The resonant capacitor 214 may either comprise a discrete component, or may be entirely provided by parasitic capacitance, or may comprise a combination of the two.

The switch 212 is controlled by a controller 210 comprising a timing control module 210a and a switch control module 210b, the timing control module providing switch on and switch off signals 210c to the switch control module 210b. The timing control module may have one or more sense inputs, such as a voltage sense input and a current sense input as illustrated, or such sensing may be omitted and the timing control module 210a may operate substantially independently of any sensed condition of the forward converter circuit.

Where voltage sensing is employed the voltage on the primary winding of the transformer may be sensed, either directly or indirectly. For example the voltage may be sensed as shown by means of a connection to a junction between the primary winding and switch; alternatively, for example, a sensing voltage may be derived from an auxiliary winding of the transformer (not shown in FIG. 2a). Where current sensing is employed this may be conveniently implemented by sensing the voltage across a current sense resistor.

In operation the circuit of FIG. 2a converts the input dc voltage, typically relatively high, to an output dc voltage, typically in a range suitable for consumer electronic devices, for example between around 5V and 20V. In some preferred implementations, the dc output is isolated from the dc input, as shown in FIG. 2a; in other implementations secondary side feedback may be employed, in which case an opto-isolator may be included to provide isolation between the primary and secondary sides of the forward converter.

In general forward converters have a number of advantages including relatively small size and low cost. However conventionally they have been difficult to regulate and the components, particularly the switch, have been prone to failure under some load conditions and at start-up. Theoretically they have a good efficiency because they may be operated in resonant mode although the conventional freewheeling or flyback diode can prevent resonance from being achieved. Further, conventionally resonance is achieved by careful choice of component values allowing self-resonance, but this entails the use of components with a tight tolerance, which is costly and increases the difficulty of manufacture.

The arrangements we describe employ a controller 210 to control the timing of the switch 212 on and off, and this allows a variety of advantageous techniques to be employed. Thus we describe below how the forward converter of FIG. 2a can be made to operate reliably over a range of component values, how current limiting and start-up control can be employed (which both help to achieve reliable operation and which help to protect switch 212), and how switching timing can be controlled in a discontinuous resonant mode to achieve regulation.

FIG. 2b illustrates an example implementation of the controller 210 of FIG. 2a. A comparator 250 compares a sensed voltage with a reference voltage, for example zero volts, to provide a control signal 252 to a switch control unit 256 to control switch 212 on. The output of comparator 250 is also provided to a timer 258 which begins timing an on pulse width. When the timer times out a signal is provided on a second control line 254 to switch control unit 256 to control switch 212 off. Switch control unit 256 may comprise, for example, a set-reset latch together with interface circuitry for driving the base of a bipolar transistor and/or the gate of an MOS transistor. Preferably the circuit also includes an OR gate 260 with an input 262 from an over current protection line. This may be generated by a comparing a current sense input with a reference level defining a threshold for current limiting. When the over current protection input 262 becomes active the switch control unit 256 is immediately controlled to switch 212 off, thus implementing cycle-by-cycle current limit control.

Figure 3A:
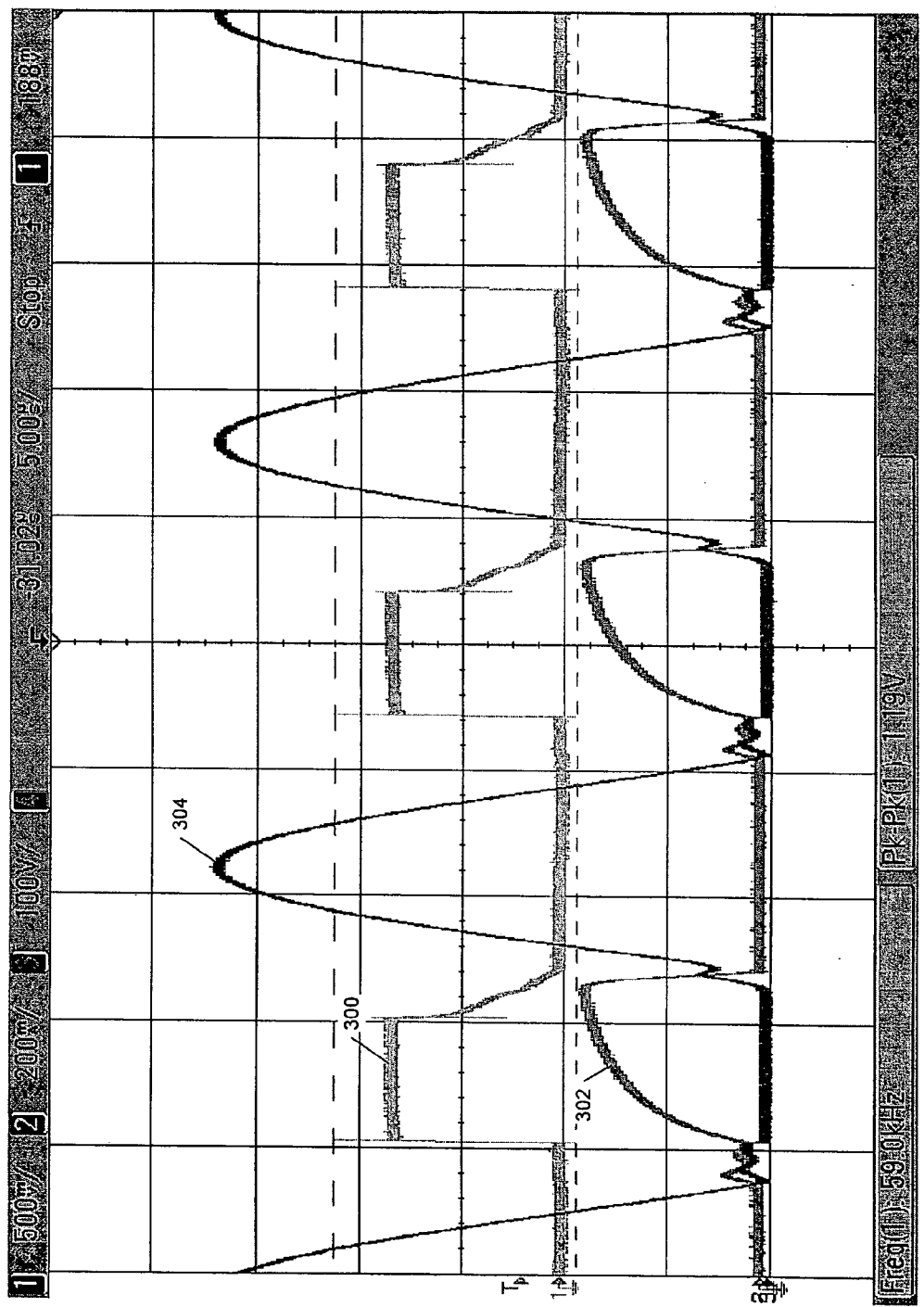
FIGS. 3a and 3b show example waveforms of the forward converter of FIG. 2a during operation from a 170V dc input supply providing output currents of, respectively, 1A and 2A.
Figure 3B:
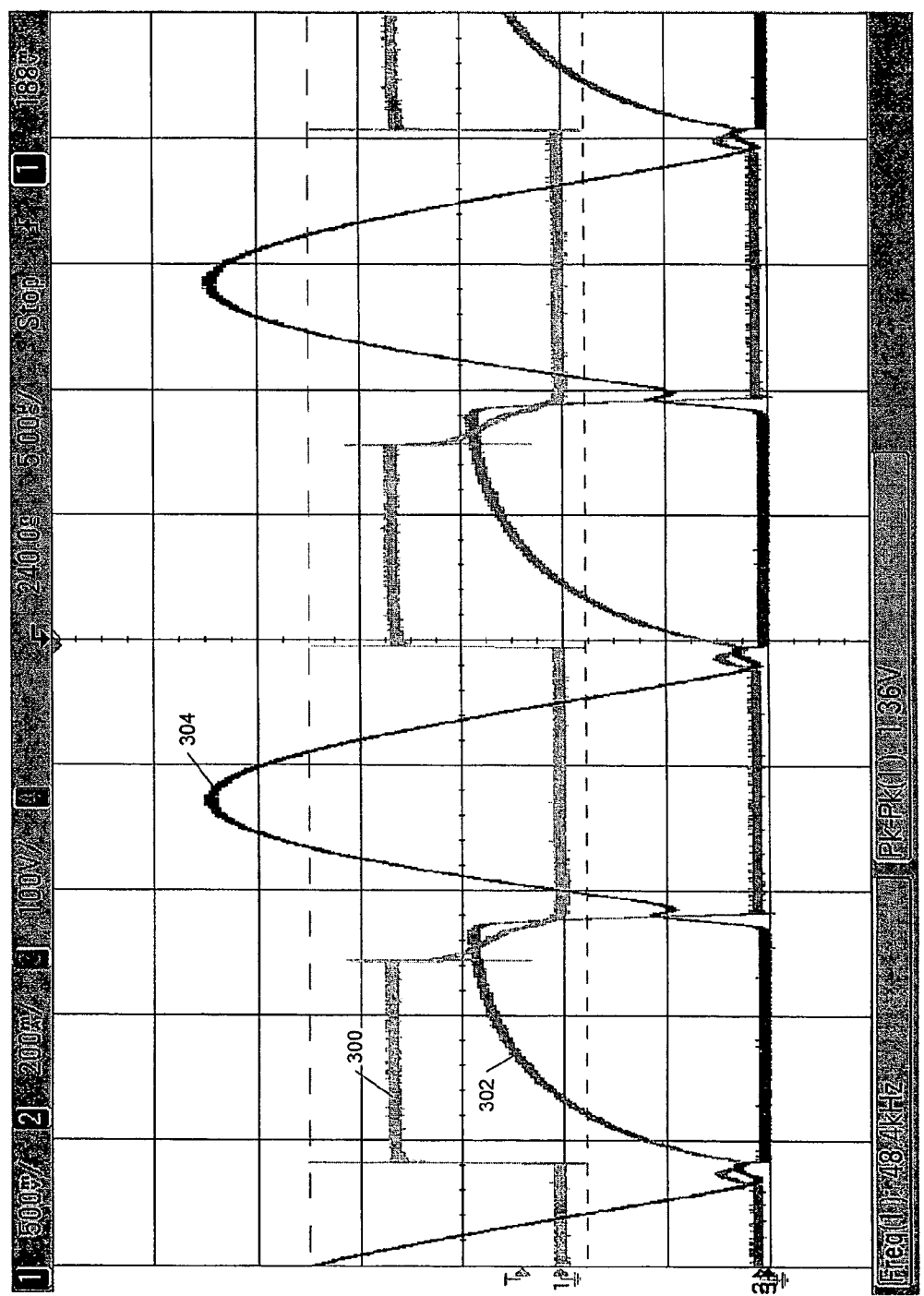

FIGS. 3a and 3b show example waveforms illustrating the operation of the forward converter of FIG. 2. In these figures (and similar later figures) waveform 300 indicates the drive voltage on the base of a bipolar transistor switch, waveform 302 shows a collector current, which is substantially equal to a current through the primary winding 204 of transformer 206 of the forward converter 200. The primary side current thus controls the flux in transformer 206 and hence also the secondary side current. Waveform 304 shows a voltage on the collector terminal of the bipolar transistor switch; when the switch is open this voltage, which is equal to the voltage on the primary winding 204 of transformer 206, is reflected on the secondary winding 208 of the transformer. When the switch is closed the current in the primary side of the transformer drives a current in the secondary side, thus charging smoothing capacitor 222 via rectifier 220; when the switch is open the primary side of the forward converter ceases to drive the secondary side and power is supplied to output terminals 218 from smoothing capacitor 222 (and diode 220 is off). In the waveforms of 3a and 3b the scale for waveform 300 is 500 mV per division, for waveform 302 is mA per division and for waveform 304 is 100V per division. In FIG. 3a the frequency of the drive waveform is approximately 59 KHz; in FIG. 3b the drive waveform has a frequency of approximately 48.4 KHz. Close inspection of waveform 300 reveals that the switch-off of the drive signal is not completely clean, which is due to the characteristics of the bipolar switch; waveforms 302 and 304 correspond.

Figure 11:
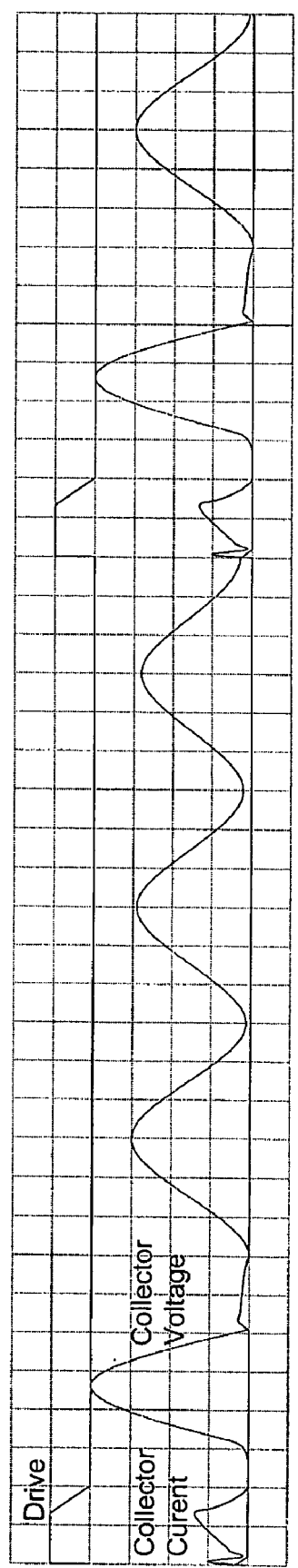
FIG. 11 shows waveforms of a resonant discontinuous forward converter employing pulse skipping and resonant valley switching illustrating example waveforms of a switch drive pulse, a switch (collector) current, and a switch (collector) voltage.

In preferred embodiments of the forward power converter we describe, after an energy transfer cycle the transformer is reset (so that it is not magnetised), during the reset phase current flowing in the transformer primary winding in an opposite direction to that in which it flows when switch 212, generally a power transistor, is turned on. The resonant action of the inductance of the transformer primary and capacitor 214 is employed to perform this reset—once switch 212 is turned off there is a half cycle sign wave on the bottom place of capacitor 214 (waveform 304). The voltage on this bottom plate is driven above the power supply voltage by the action of the inductor so that at the top of the sign wave the voltage across the transformer primary is in the opposite direction to that during forward energy transfer. (At this point there is a relatively high voltage across switch 212, approximately 550V in the example waveform 304 of FIG. 3a, significantly higher than the input voltage and the switch should therefore be able to sustain such a voltage without breakdown). As the capacitor discharges and the voltage across the switch 212 falls back to 0 the current flowing in the transformer primary is in the opposite direction to the direction of current flow during a forward energy transfer portion of the power supply cycle and thus the transformer is reset. If the switch is not switched on at this time the resonance continues with a gradually diminishing series of resonant peaks (see FIG. 11 later). Preferably the switch 212 is turned on when the voltage across the switch is substantially at a minimum, that is close to 0V (FIG. 3; FIG. 11, later).

Figure 4:
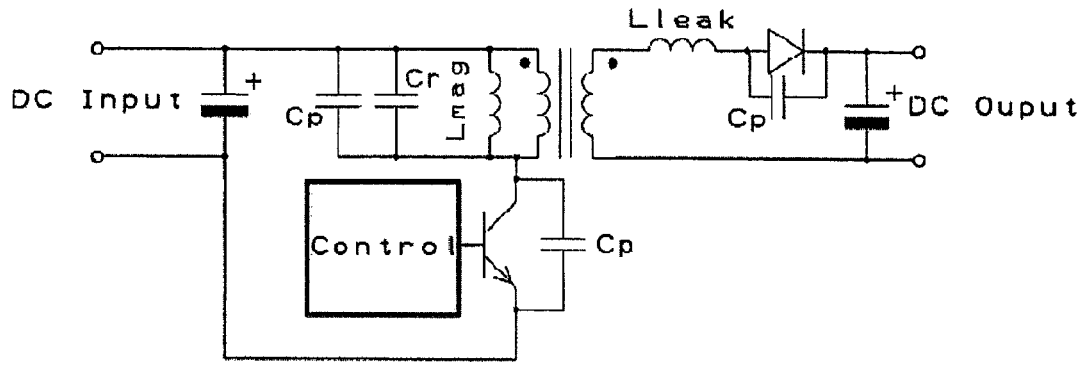
FIG. 4 shows an equivalent circuit model of a forward converter power supply according to our design.

FIG. 4 shows an equivalent circuit for the discontinuous resonant forward converter of FIG. 2a. This shows the parasitic capacitance ($C_p$) of the bipolar transistor switch, output rectifier and transformer, as well as the resonant capacitor ($C_r$), a magnetising inductance (Lmag) which represents energy stored in a transformer and a leakage inductance (Lleak) which represents leakage inductance between the primary and secondary windings of the transformer (because some flux lines leak linking the primary and secondary coils so that they behave similarly to an inductor). Generally, but not necessarily, $C_r$ is much greater than $C_p$. In operation Lmag keeps the primary current flowing into $C_r$ causing resonance, and the secondary current approximately matches the primary current. The leakage inductance provides a degree of current limiting, in particular helping to reduce overload at start-up when the smoothing capacitor can effectively appear as a short circuit.

Figure 5A:
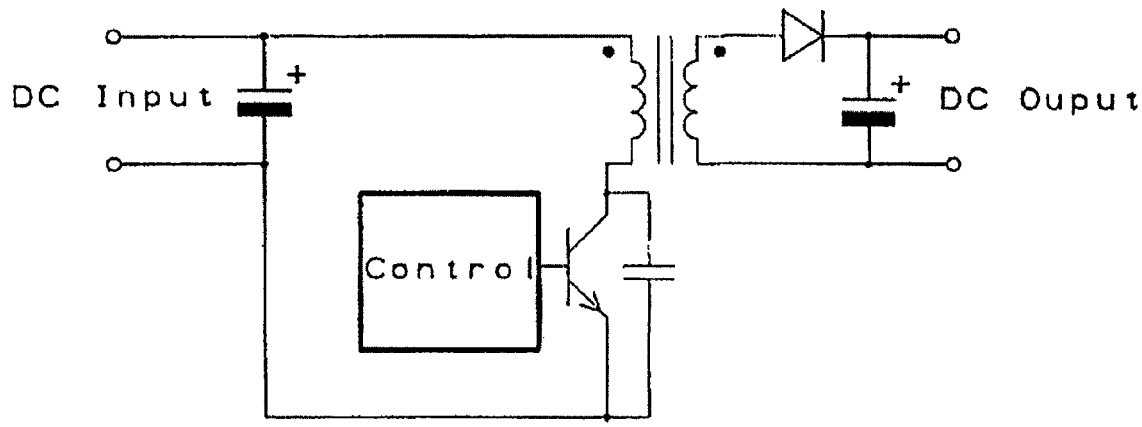
FIGS. 5a to 5d show alternative topologies for a forward converter according to our design.
Figure 5B:
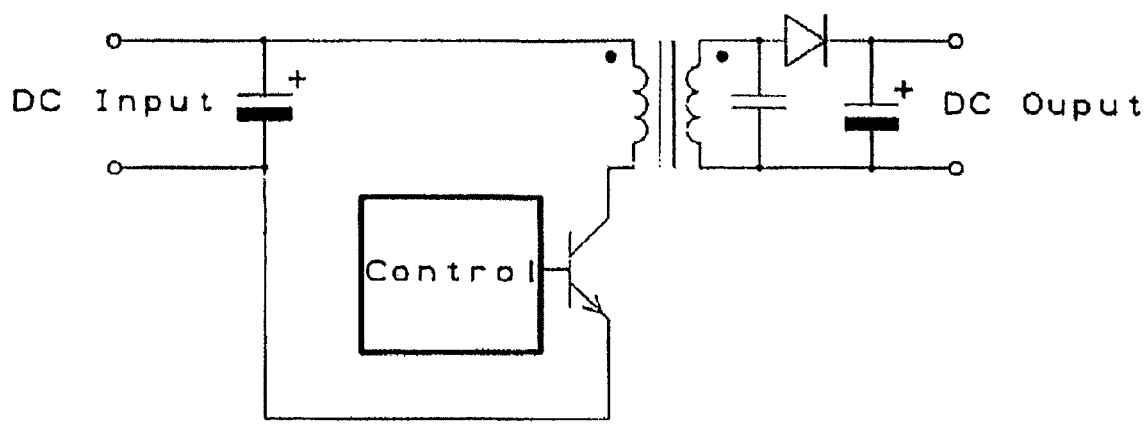
Figure 5C:
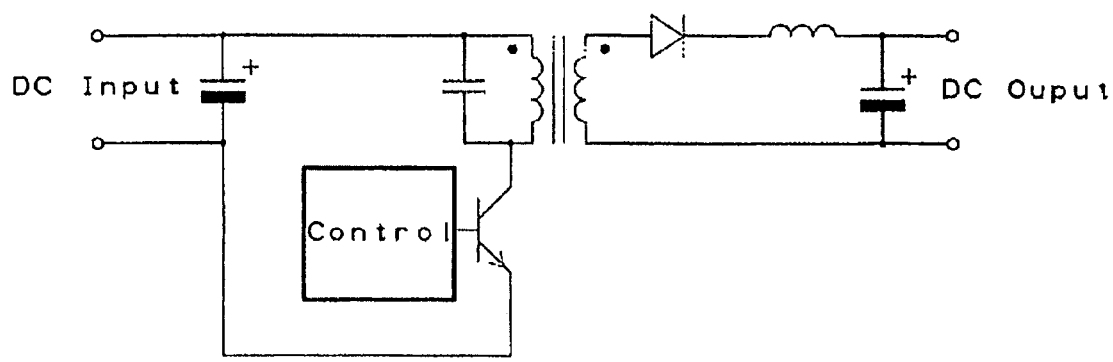
Figure 5D:
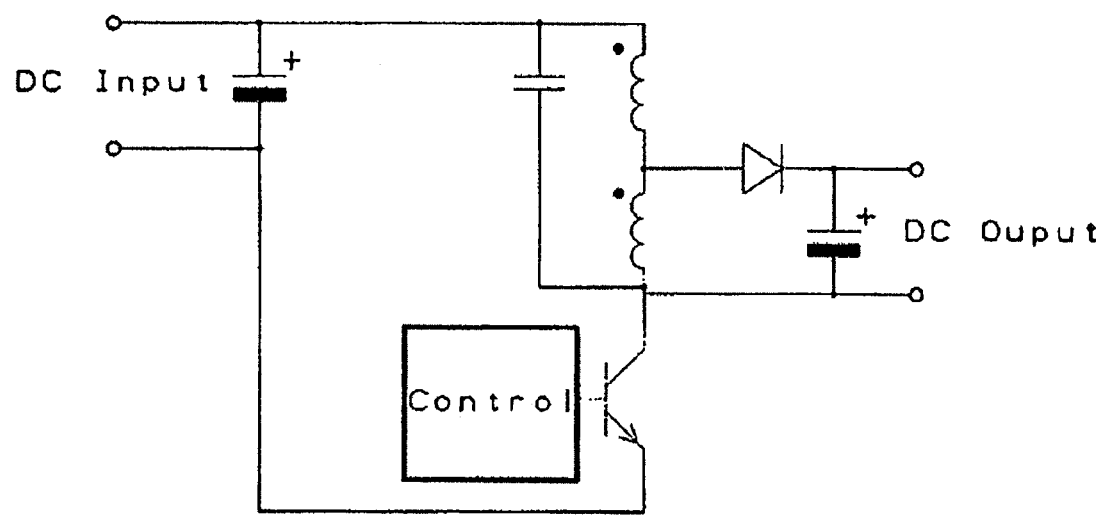

FIGS. 5a to 5d show alternative topological configurations for the resonant discontinuous forward converter. In FIG. 5a the resonant capacitor is coupled across the switch (in this example, shown as a bipolar transistor switch). In FIG. 5b the resonant capacitor is on the output side of the converter, more particularly, connected across the secondary winding of the transformer. In FIG. 5c a small inductor is explicitly included in series with the output rectifier. FIG. 5d illustrates a configuration of the forward converter in which an auto-transformer is employed.

Figure 6A:
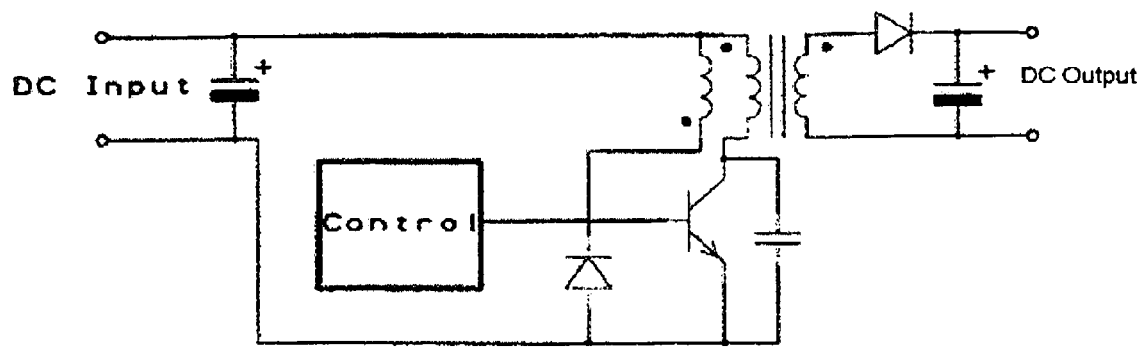
FIGS. 6a to 6c show examples of using an auxiliary winding to reset a transformer of a forward converter.
Figure 6B:
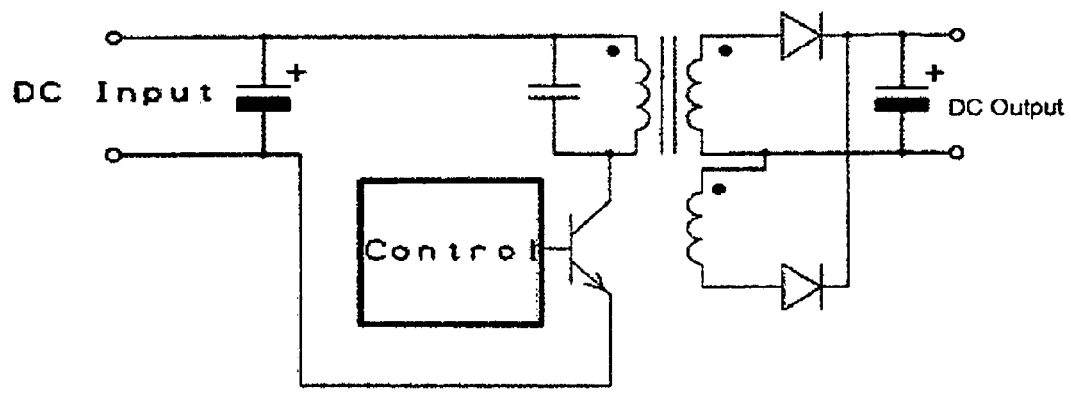
Figure 6C:
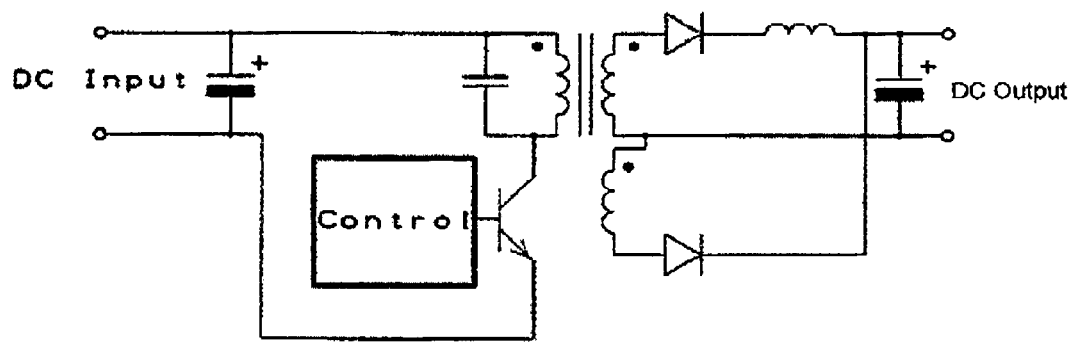

In embodiments the transformer is reset by the resonant portion of the transformer waveform: to demagnetise the transformer the magnetisation current discharges into the resonant capacitor and discharges resonantly. Additionally or alternatively the transformer may be reset by means of an auxiliary winding coupled in series with a rectifier. FIG. 6a shows an example of such a reset circuit in which a primary side auxiliary winding of the transformer has an opposite or inverted polarity compared with the primary and secondary windings of the transformer. During the off period of the switch a diode in series with the auxiliary winding becomes forward biased and conducts power back to the dc input (so that the technique is non-dissipative). FIGS. 6b and 6c show alternative configurations in which the auxiliary winding is placed on the secondary side of the transformer and (again) has an opposite polarity to the primary and secondary windings (the diodes on the secondary side are connected to opposite ends of the windings). In these examples the auxiliary winding is connected in series with a rectifier and across the secondary winding and rectifier, and optionally inductor, in the output side of the forward converter.

Referring again to FIGS. 2 and 3, it can be seen by comparing waveforms 304 and 300 that there is a short period after waveform 304 goes to substantially zero volts before the drive signal 300 to the bipolar transistor switch turns the switch on. If there were sufficient delays further resonance would eventually be seen in waveform 304 but nonetheless it can be appreciated that there is a range of periods during which the switch may be once again turned on and thus the switch may be controlled by detecting a substantially zero voltage level of waveform 304 after its resonant half cycle and then waiting for a delay (which may be zero) before turning the switch on. This tolerance in the operation of the circuit, based upon zero-voltage or resonant-valley switching, allows the switching timing (more specifically, the switch off time) to be sufficiently long to cope with a range of resonant frequencies, and hence resonant component values.

We next consider start-up of the forward converter. On start-up the output of the power supply appears as a short circuit. Unlike continuous forward converters, which employ a flyback diode, depending upon the load present on the RDFC insufficient energy may be transferred to the output of the converter to charge the output capacitor. This is particularly a problem where current limiting is employed since very high currents can appear on the primary side of the transformer and the current limiting can activate to switch off the drive signal which can have the consequence that, with certain loads, the output capacitor may not be charged.

Figure 7A:
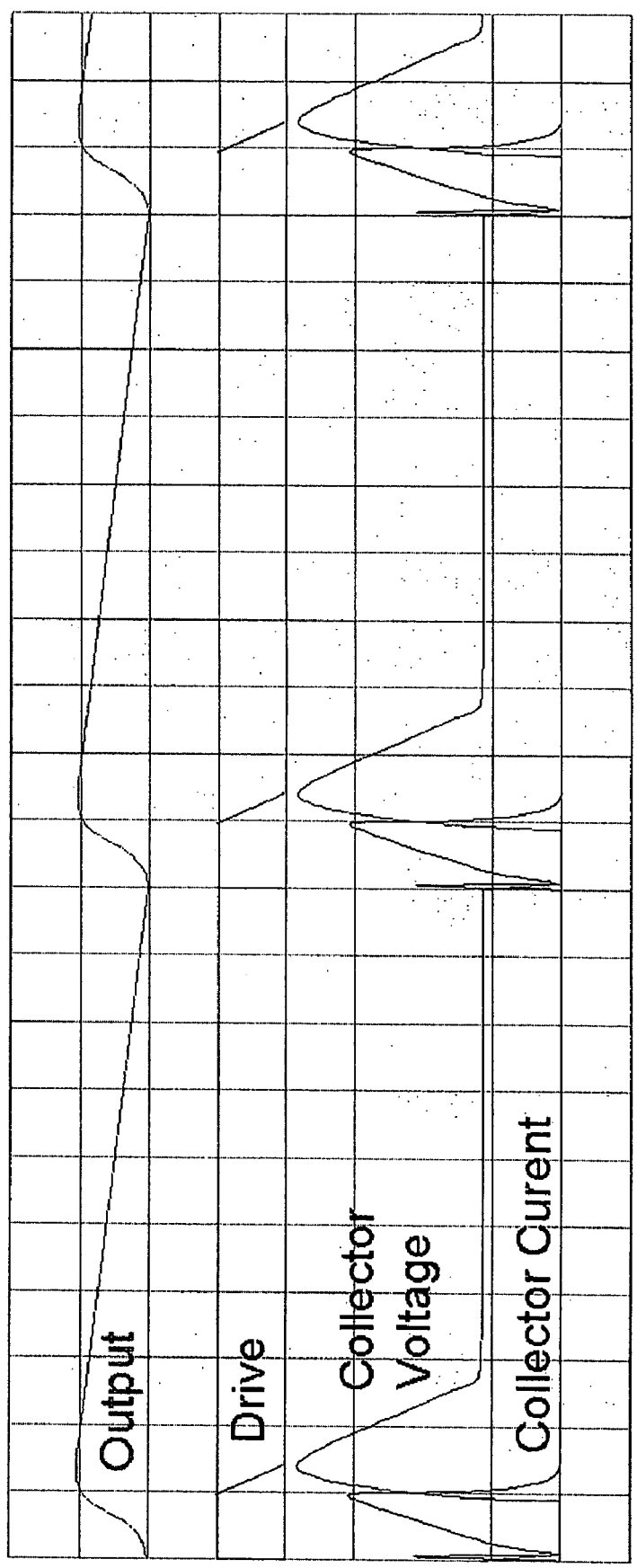
FIGS. 7a and 7b show waveforms for a forward converter respectively without and with high frequency control during start-up.

FIG. 7a illustrates this difficulty showing that, with current limiting, during start-up the output (voltage) of the power supply may not rise up to its correct value. Inspection of the collector voltage waveform also reveals that there is a non-zero component to this when the switch is off (because the secondary side output is reflected in reverse) and this non-zero collector voltage may be sensed in order to identify this start-up condition, as well as current limit, overload and short circuit if desired.

Figure 7B:
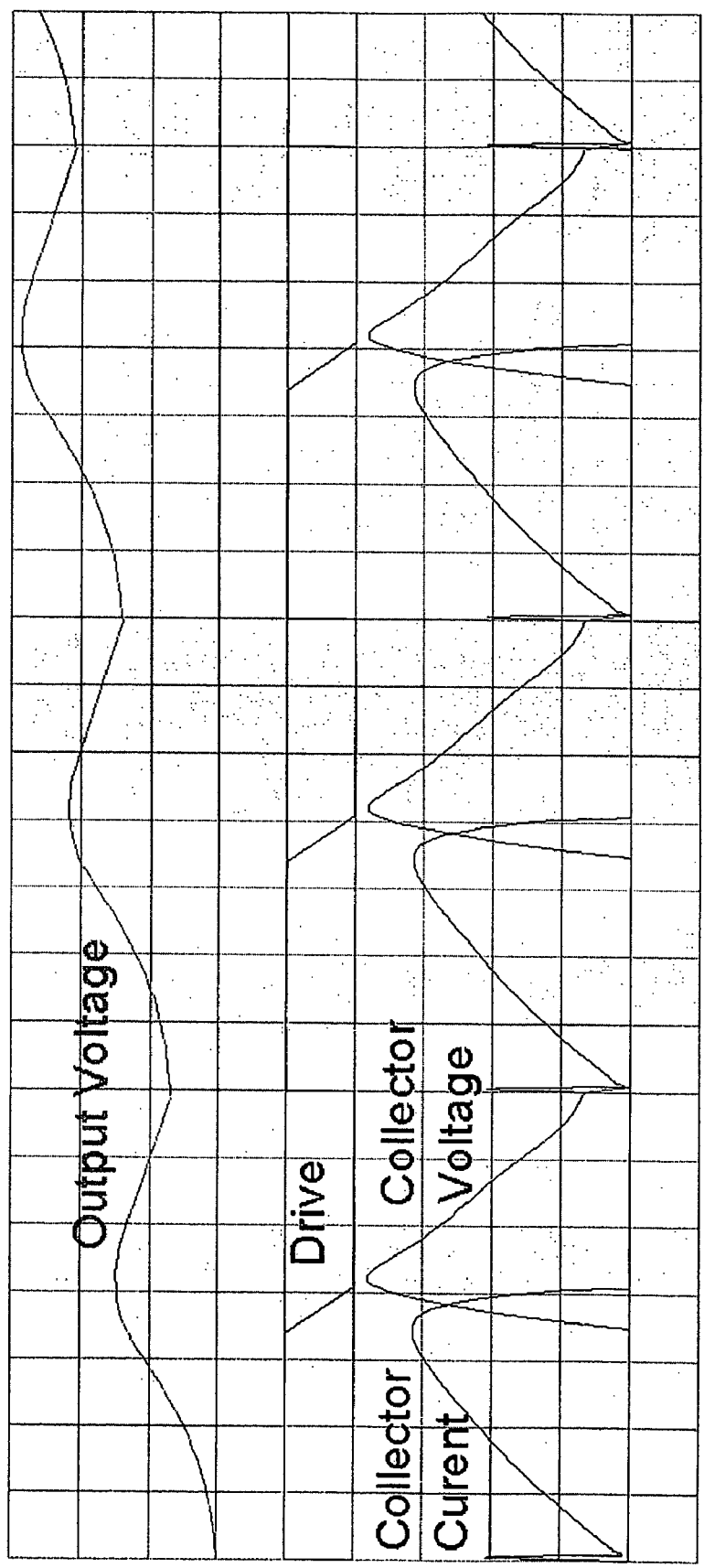

In preferred embodiments of the discontinuous resonant forward converter, the forward converter is controlled to operate in an increased frequency mode at start-up, for example at 5 or 10 times a normal frequency of operation. This may be implemented by means of a simple oscillator selected at start-up or the collector voltage may be sensed and used to control the switch on to invoke a higher frequency mode of operation. Operating the RDFC at an increased frequency increases the charge transferred to the output whilst still protecting the power switch. FIG. 7b illustrates this increased frequency operation (the time divisions are shorter than those shown in FIG. 7a) and it can be seen that the output voltage in this high-frequency start-up mode has an upward trend. Over time the output voltage increases to a normal operating output voltage for the forward converter.

We next describe current limiting systems for a discontinuous resonant forward converter.

Once the RDFC has started up and achieved steady state operation, it operates in a resonant mode with an output (voltage) that tracks the input (voltage). However if an overload is applied, in particular when operating at a fixed frequency, the output current and hence the switch current will increase significantly and the circuit may be damaged. It is therefore desirable to sense the switch current in the RDFC and the controller we describe enables the drive to be shortened to control the drive current in an overload condition.

Figure 8A:
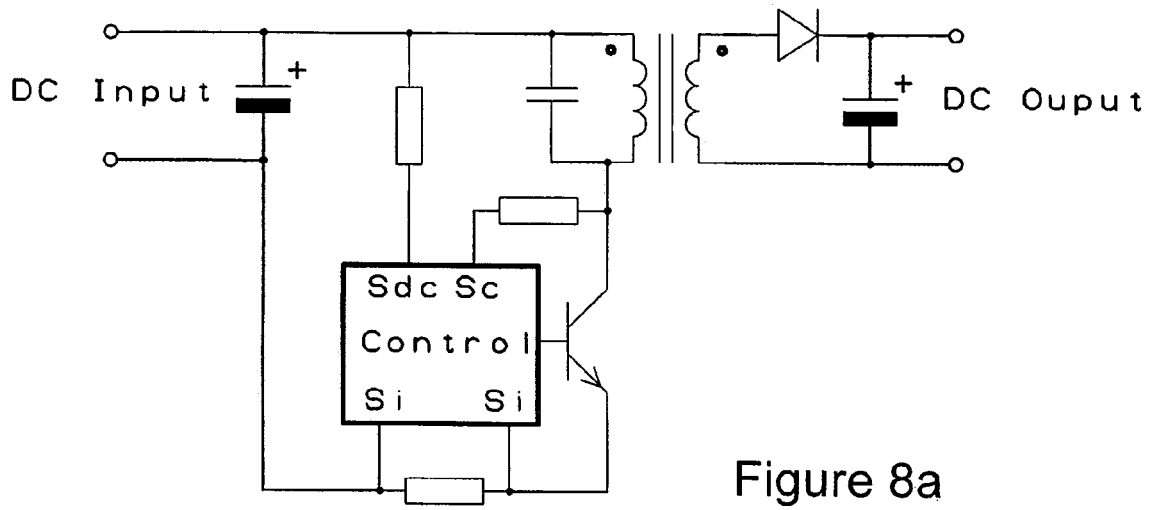
FIGS. 8a to 8c show, respectively, a configuration of input sensing connections, and a forward converter in, respectively, overload and no load conditions.
Figure 8B:
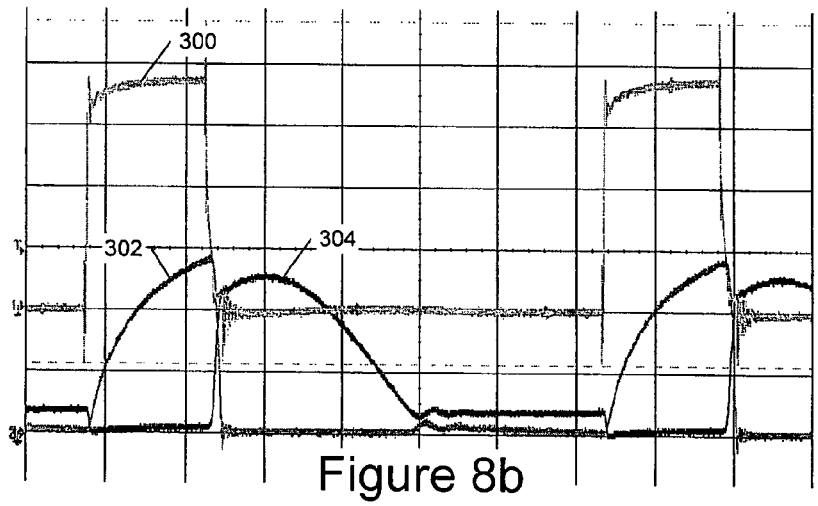
Figure 8C:
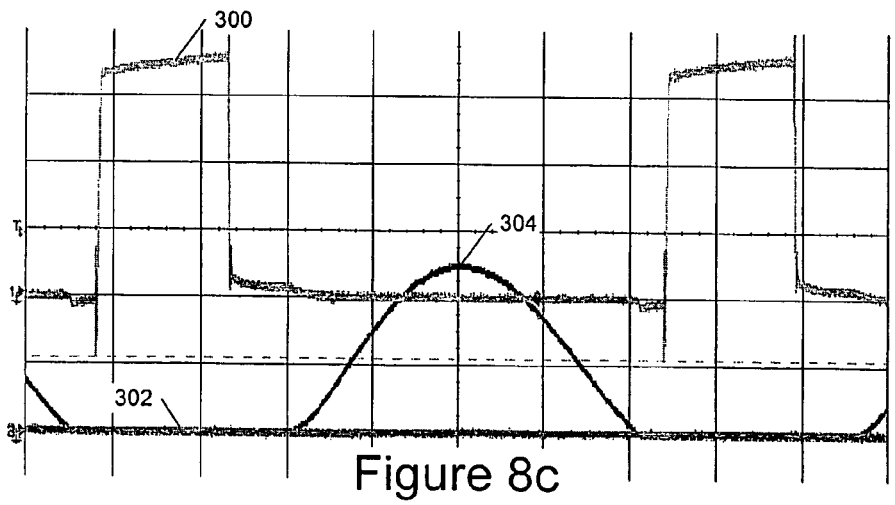

FIG. 8a shows an embodiment of an RDFC which includes a controller with current sense terminals (Si) as well as collector voltage (Sc) and dc input voltage (Sdc) sense inputs. FIG. 8b illustrates waveforms of a forward converter during overload, in which it can be seen that the collector voltage waveform is no longer properly resonant (the first portion of the half cycle having been truncated) because of loading by the output circuit. For comparison, FIG. 8c shows a forward converter under no-load conditions.

We have described above how over current protection may be implemented. However there are situations in which a fixed current limit converter can reduce the power transferred to the output, this in turn reducing the output voltage, which increases the output current, which can result in the converter output voltage falling significantly, even when the load is removed. In this situation it is possible that the forward converter may not recover. To address this one or more of a number of strategies may be employed. For example an increased frequency re-start may be employed, effectively as described above, to bring the output voltage back up to its normal operating level. Additionally or alternatively an output side inductance may be employed and/or the leakage inductance of the transformer may be controlled (generally allowed to increase) in order to provide a current limiting effect. Also, the current limit may be varied, increasing the current limit as the pulse width reduces. This latter strategy, in particular, is described in more detail later.

In more detail, in some applications, such as a constant current load, the output voltage may enter a state in which it continuously falls and in which the power supply is not able to deliver full power. By increasing the frequency in a similar manner to that described above during start-up the power delivered to the load can be increased, thus increasing the output voltage. In this way it is also possible to regulate whilst in current limit at a reduced output voltage; the leakage and/or a series inductance may also be employed to drop a part of the output voltage across this inductance.

When the forward converter is operating in a current limited mode it is nonetheless possible to regulate the output current by increasing the allowable switch current as the pulse width is reduced. This can be achieved safely in an RDFC of the type we describe because the risk of damage to the converter is reduced with reducing pulse width. Combining this with the leakage inductance of the transformer and/or a series output inductance enables the output current to be regulated as the output voltage falls. Thus, broadly speaking the effect is that an increasing pulse width results in a reduced current limit.

Figure 9A:
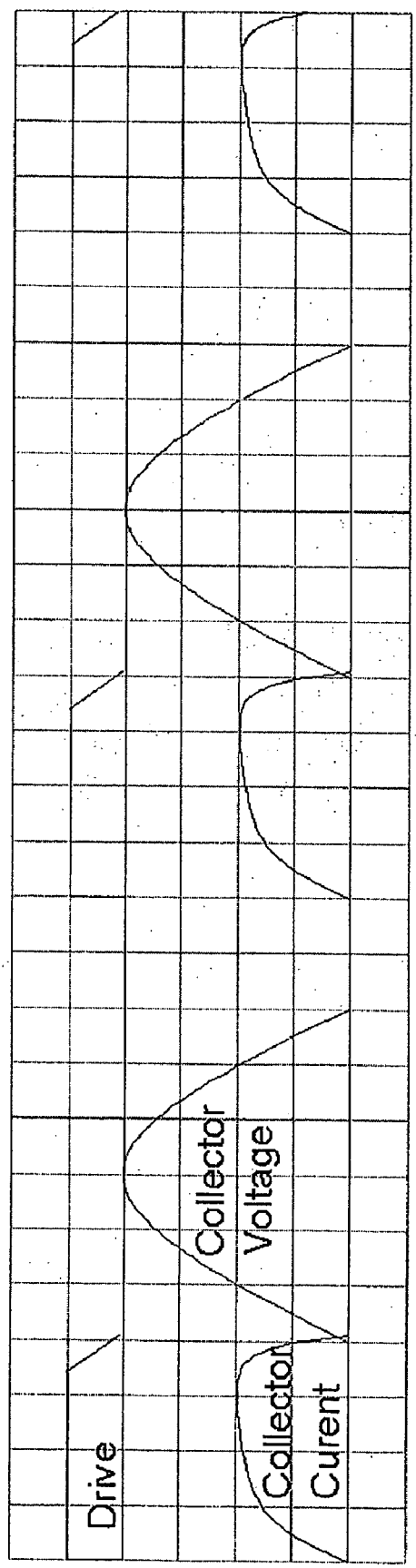
FIGS. 9a to 9c show examples of, respectively, late, early and target timings for waveforms of a forward converter.
Figure 9B:
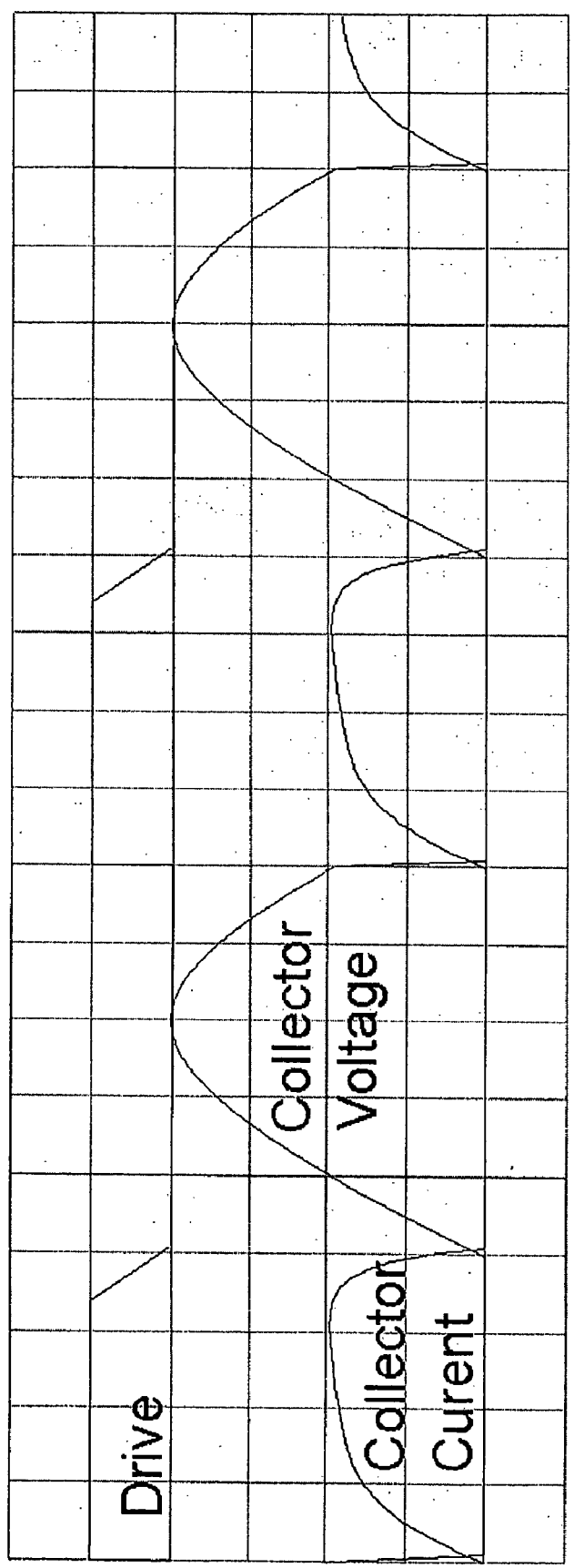
Figure 9C:
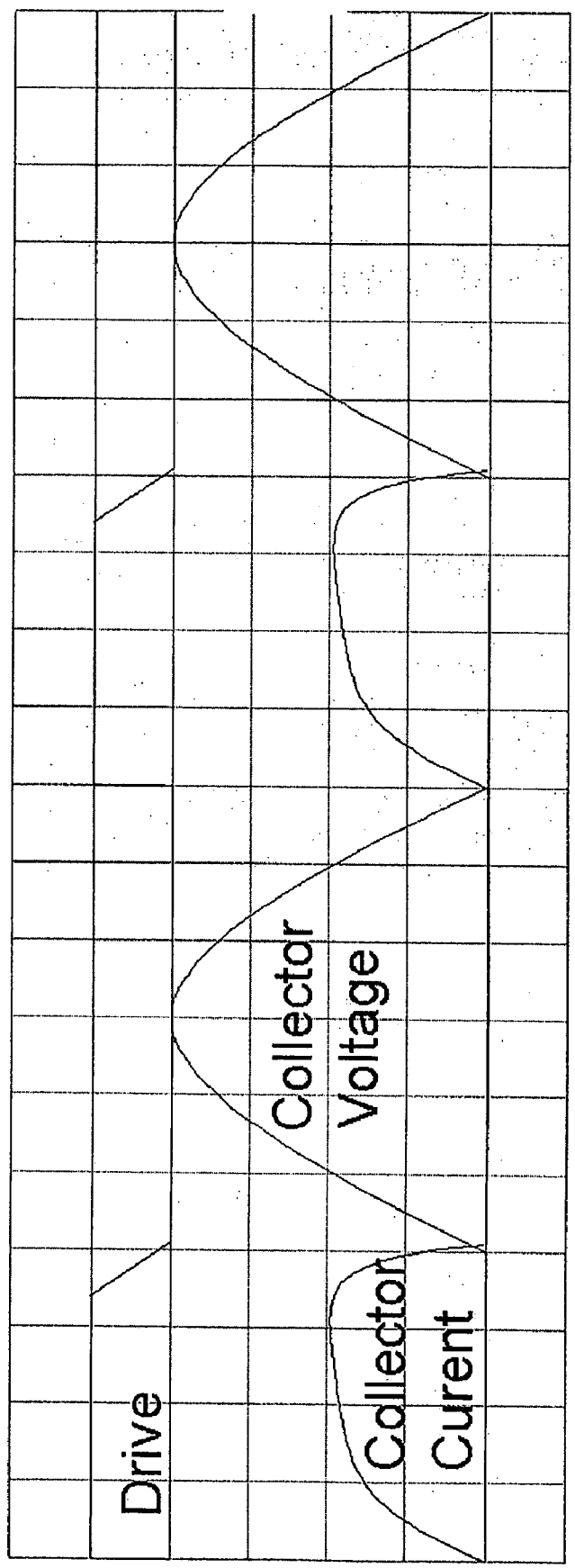

We now discuss further techniques which can be employed to compensate for the use of components with relatively wide tolerances. It is difficult to manufacture a power transformer with a tight tolerance primary magnetising inductance. One technique is to clean and glue the cores, but this is expensive. A tight tolerance resonant capacitor is also expensive. We have previously described how a fixed frequency oscillator in the controller can be employed together with a suitable choice of duty cycle to compensate for increased tolerances in these components. Another technique comprises compensating for tolerances by controlling the switch so that it turns on during the zero voltage phase of the primary (voltage) waveform. As previously described, there is a dead time while the switch voltage is at approximately zero volts (in practice the voltage may be slightly below ground potential). In zero voltage switching (ZFS) embodiments of the controller, the power switch is turned on during this time interval. FIGS. 9a to 9c illustrate different example timings for the switch drive with respect to the collector voltage waveform.

Referring to FIG. 9a, this shows an example in which zero voltage switching is achieved but in which the switch is turned on later than ideal. However this is preferable to turning the switch on too early, as shown in FIG. 9b, which can result in non-zero voltage switching, which causes switching losses and electromagnetic interference (EMI). FIG. 9c shows a preferred timing of the switch drive with respect to the collector voltage waveform.

A preferred timing of FIG. 9c can be achieved by sensing when the collector voltage is at zero volts and turning the switch on in response to this, either as soon as the collector voltage has fallen to zero, or a short time after the voltage has reached zero, or just as the collector voltage starts to rise again. The timing of FIG. 9c illustrates that of a "perfect" resonant switch, with the switch turning on just as the collector voltage reaches zero.

We next discuss regulation of the output voltage of an RDFC. In general the regulation can be poor due to relatively high leakage inductance and component (winding) resistances. The result of this is that as more load is applied to the converter, the output voltage falls. Further an RDFC can have difficulty in compensating for variations in input voltage and, in general, the output voltage tracks the input voltage. This can be a particular problem in forward converters run off a grid mains supply because the mains voltage can often vary significantly. However embodiments of the controller described above are suitable for implementation of one or both of pulse width and pulse frequency control in order to regulate the output voltage of an RDFC. More particularly, increasing the pulse width and/or increasing the frequency during either or both of low input and high load conditions can improve regulation.

Figure 10A:
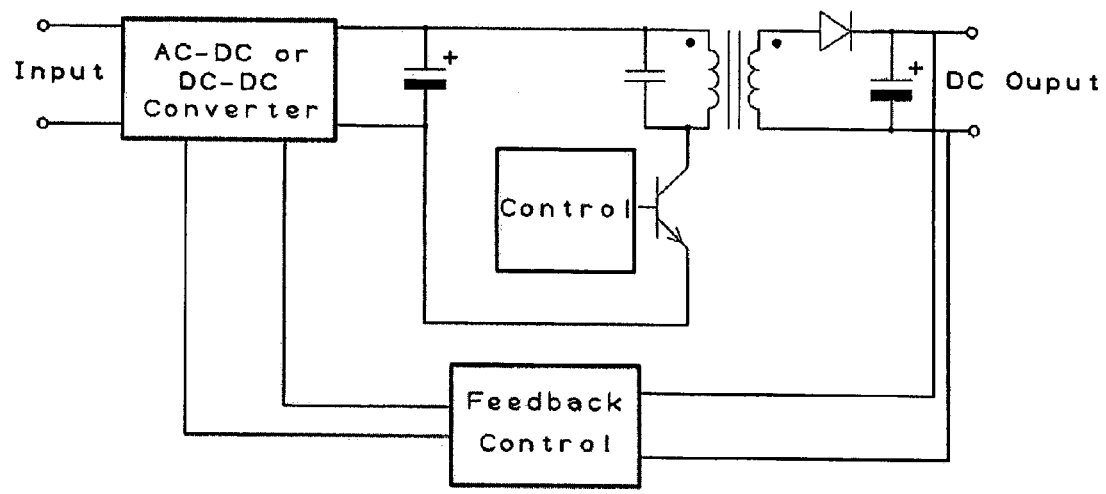
FIGS. 10a and 10b show, respectively regulation of a forward converter using secondary side feedback, and a multiphase forward converter circuit.

FIG. 10a shows another technique which may be employed for output voltage regulation. In this arrangement an input voltage converter, either an ac-to-dc or a dc-to-dc converter is used to provide a dc input power supply to the forward converter, and this is controlled by feedback from the secondary side of the forward converter. In order to regulate the output voltage. The input converter may comprise a boost or buck or PFC (Power Factor Correction) stage.

Figure 10B:
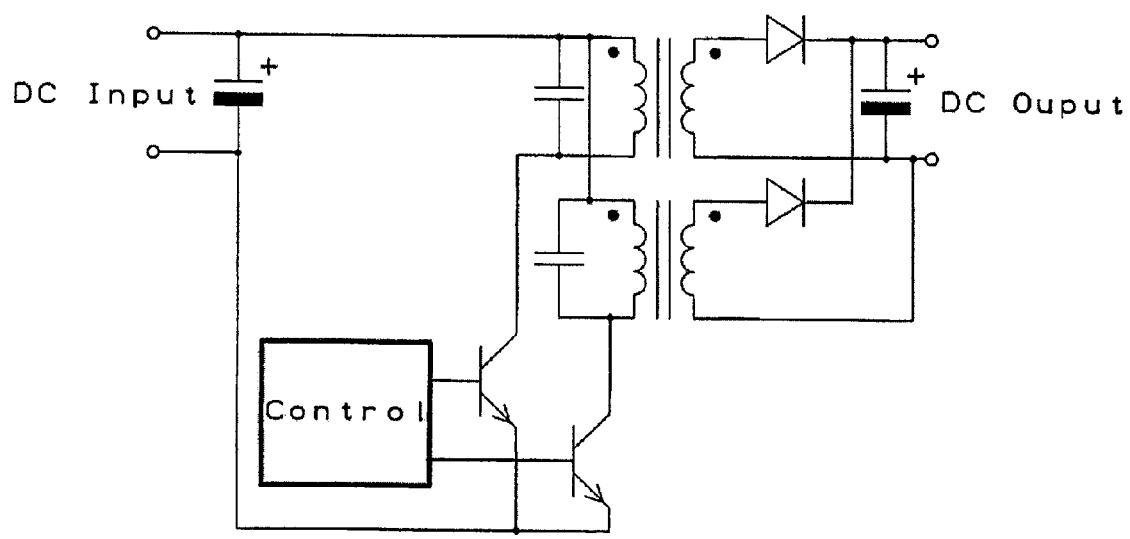

FIG. 10b illustrates the use of two power transformers in a multiphase configuration to improve output regulation. In the arrangement of FIG. 10b the switches are controlled so that each switch is only driven on when the other switch is off, creating complementary, but non-overlapping, drive waveforms. This technique is useful for small size forward converters operating at relatively high frequencies where regulation may be poor.

Referring to FIG. 11, we now describe some techniques for implementing low-load and/or standby mode operation of an RDFC. In some preferred embodiments we employ pulse-skipping techniques.

An RDFC power supply operating at maximum frequency is typically inefficient at low loads and has high standby power consumption. Thus when load is reduced on an RDFC, efficiency reduces, and in particular no-load performance is poor. This is caused mainly by high switching losses and high magnetising current and the like. However by controlling the on and off times it is possible reduce power consumption, in particular by employing PWM and PFM techniques described above, in addition or alternatively skipping pulses for one cycle up to time equivalent to many cycles. It is also preferable to control the timing of these pulses to coincide with valleys in the resonant waveform such that the RDFC switches quasi-resonantly on subsequent valleys.

Figure 12:
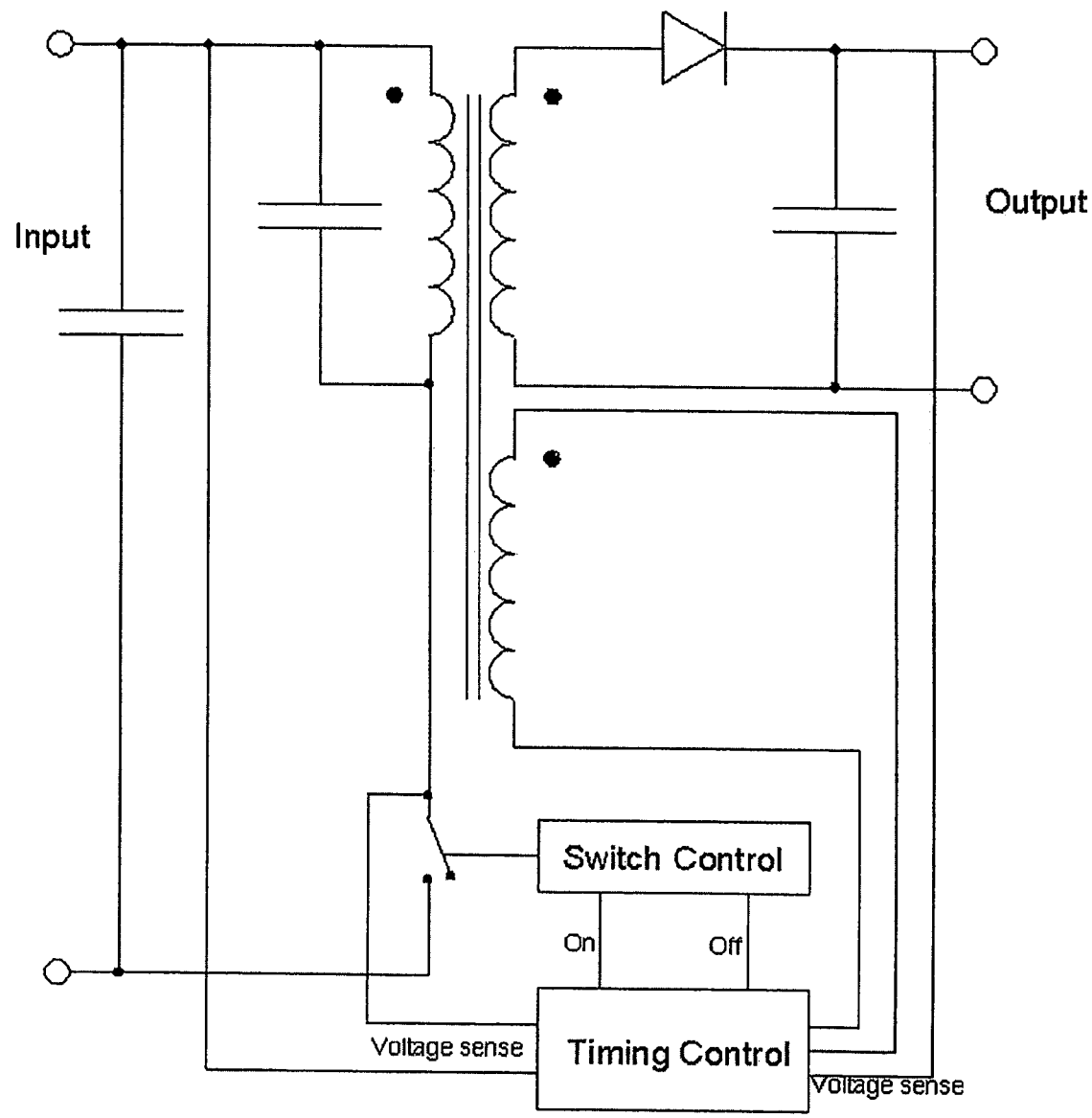
FIG. 12 shows example voltage sensing circuit techniques in a resonant discontinuous forward converter, in particular for ripple reduction.

Thus in implementations of our system we reduce the pulse width by turning the switch off earlier to define a shorter pulse, which can reduce low load power consumption. Additionally or alternatively we introduce a delay in turning the switch on later for the following pulse, skipping one or more switch drive pulses. This is illustrated in FIG. 11, in which the drive pulse is delayed to skip one or more of resonant cycles, as illustrated indicated by the switch (collector) voltage. There is a spike in switch (collector) current at turn-on as the resonant switch waveform is clamped to zero volts, and FIG. 11 also illustrates resonant valley switching in which the switch is turned on at a valley point of the resonant waveform, to reduce losses. These techniques can be implemented by a controller as previously described, for example with a sensing arrangement as shown in FIG. 8a, or alternatively with voltage sensing as shown in FIG. 12, and, for example, with a control arrangement as shown in FIG. 2b. A reduced power mode such as a pulse width modulation (reduction) or pulse skipping mode can, for example, be triggered by an event such as one or more of the controller (chip) power supply falling below a pre-defined value; after a second resonance (see FIG. 11), or after a pre-determined time (between drive pulses). A pulse skipping technique in the RDFC such as that described above increase efficiency and can give reduced power consumption at low loads or in standby. The pulse skipping technique also enables a faster response time when at low loads.

A still further technique we employ in implementations of the system, in particular where the switch comprises a (bipolar) transistor, is to limit the switch current rather than operating the transistor in a linear region. This protects the switch from overheating. In implementations when the switch is turned off there is a sharp rise in the primary side voltage on the switch and this may be sensed and controlled, for example by turning the transistor on to limit the overshoot. Thus, for example, the switch may be turned partially on during start-up to catch and limit voltage overshoot.

We next describe some techniques for ripple rejection suitable for use with an off-line (mains-powered) RDFC converter. Referring to FIG. 12, this shows examples of how a mains ripple voltage may be sensed in a resonant discontinuous forward converter. As can be seen, the input voltage ripple may be sensed from a number of points, including the input DC bus, the collector voltage, a transformer winding voltage and/or the output voltage. In embodiments a small amount of the mains ripple voltage is fed into the timing control circuit to vary the PWM and/or PFM signal in order to adjust in real time for the input ripple voltage and hence implement ripple reject. The operational frequency of the RDFC is (much) higher than that of the 50 Hz or 60 Hz mains ripple, and thus the timing control circuit can track and compensate for the effects of the line ripple in a similar way to control of the dc output voltage.

Broadly speaking we have described resonant discontinuous forward converters which employ a controller to analyse one or more inputs and determine turn-on and turn-off times for a power switch, providing a drive signal accordingly (although in simple systems a substantially fixed frequency/duty cycle drive may be employed). The pulse width and/or frequency may be adjusted in accordance with the resonance circuit in order to alleviate tolerance issues in the resonant components, either using sensing signals input to the controller or by means of a free-running oscillator. Preferably, to ensure that the maximum energy is passed through the RDFC without significantly compromising the resonant behaviour and increasing losses or EMI the controller is configured to implement zero (switch) voltage switching. Preferably the controller is configured to terminate an on-pulse when an over current condition is detected, in order to protect the circuit (switch) and/or load. Preferably embodiments of the RDFC employ an increased frequency during start-up and/or current limit in order to assist the output voltage rise. Either or both of PWM and PFM techniques may be employed in order to improve load and line regulation.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A controller for a resonant discontinuous forward converter (RDFC), said forward converter including a transformer with first and second matched polarity windings and a switch to switch dc power to said first winding of said transformer, said converter further having a dc output coupled to said second winding of said transformer, and wherein said controller has two modes, a first operational mode during which said switch is controlled to switch said dc power at a frequency which substantially coincides with a resonant frequency of operation of said RDFC such that said RDFC supplies power from said dc output, and a second, reduced power operational mode during which a drive to said switch is controlled to increase a proportion of time during which said switch is off, wherein said controller is configured to:

control said switch to switch at a timing which is substantially synchronised with a timing of cycles of said resonant frequency of operation; and wherein in said second mode of operation said switch is controlled such that one or more of said resonant frequency cycles are skipped.

2. The controller as claimed in claim 1 wherein said switch drive comprises a pulse a duration of which determines an on time of said switch, and wherein in said second mode of operation said controller is configured to reduce a duration of said pulse.

3. The controller as claimed in claim 1 wherein said controller is configured to control said switch such that after one or more of said cycles have been skipped when said switch is next controlled to turn on said turn-on is timed to substantially coincide with a turning-point in a resonant waveform of said RDFC.

4. The controller as claimed in claim 1 wherein said controller is configured to control said drive to said switch such that said switch turns on only when a voltage across said switch is approximately zero volts.

5. A controller as claimed in claim 1 wherein said controller is configured to sense a reduced load condition and to select said second operational mode responsive to said sensing.

6. The controller as claimed in claim 5 wherein said controller has a voltage sense input to sense a signal from an output side of said RDFC and is configured to identify said reduced load condition from said sensed signal.

7. The controller as claimed in claim 5 wherein said controller has an input to receive a signal from an auxiliary winding of said transformer and is configured to identify said reduced load condition responsive to said auxiliary winding signal.

8. The controller as claimed in claim 5 wherein said controller has a controller power supply and is configured to sense said reduced load condition from said power supply.

9. The controller as claimed in claim 1 wherein said controller is configured to control said drive to said switch such that said switch turns on substantially at a turning point of a resonant waveform of said RDFC.

10. The controller as claimed in claim 1 wherein said second operational mode comprises a standby mode of said RDFC.

11. A controller for a resonant discontinuous forward converter (RDFC), said forward converter including a transformer with first and second matched polarity windings and a switch to switch dc power to said first winding of said transformer, said converter further having a dc output coupled to said second winding of said transformer, and wherein said controller has two modes, a first operational mode during which said switch is controlled to switch said dc power at a frequency which substantially coincides with a resonant frequency of operation of said RDFC such that said RDFC supplies power from said dc output, and a second, reduced power operational mode during which a drive to said switch is controlled to increase a proportion of time during which said switch is off, wherein said controller is configured to:

sense a reduced load condition and to select said second operational mode responsive to said sensing; and select said second operational mode in response to detection of more than one resonance during a period when said switch is off.

12. A controller for a resonant discontinuous forward converter (RDFC), said forward converter including a transformer with first and second matched polarity windings and a switch to switch dc power to said first winding of said transformer, said converter further having a dc output coupled to said second winding of said transformer, and wherein said controller has two modes, a first operational mode during which said switch is controlled to switch said dc power at a frequency which substantially coincides with a resonant frequency of operation of said RDFC such that said RDFC supplies power from said dc output, and a second, reduced power operational mode during which a drive to said switch is controlled to increase a proportion of time during which said switch is off, wherein said controller is configured to:

sense a reduced load condition and to select said second operational mode responsive to said sensing; and select said second operational mode in response to an off-duration of said switch being greater than a threshold duration.

13. A discontinuous resonant forward converter for converting an input dc voltage to an output dc voltage, the converter comprising:
- first and second dc inputs;
- a transformer having primary and secondary windings with matched polarities;
- a controllable switch for switching power from said dc inputs through said primary winding of said transformer, said controllable switch and said primary winding of said transformer being coupled in series between said first and second dc voltage inputs;
- first and second dc voltage outputs;
- a rectifier coupled to said secondary winding of said transformer, said rectifier and said secondary winding of said transformer being coupled in series between said first and second dc voltage outputs;
- a smoothing capacitor having a first connection coupled to receive dc power from said rectifier at a first connection node, said first connection node being coupled to said first dc voltage output, said smoothing capacitor having a second connection coupled to said second dc voltage output; and
- a controller having an output coupled to said controllable switch and being configured to control said switch such that a voltage waveform on said secondary winding has a first portion during which said switch is on and current flows into said first connection node, and second portion during which said switch and said rectifier are both off; and
- wherein substantially no current flows into said first connection node during said second portion of said voltage waveform other than from said smoothing capacitor, and wherein:
  - said forward converter has two modes, a first operational mode during which said switch is controlled to switch said dc power at a frequency which substantially coincides with a resonant frequency of operation of said RDFC such that said RDFC supplies power from said dc output, and a second, reduced power operational mode during which a drive to said switch is controlled to increase a proportion of time during which said switch is off, wherein said forward converter is configured to automatically sense a reduced load condition and to select said second operational mode responsive to said sensing.

14. A discontinuous resonant forward converter for converting an input dc voltage to an output dc voltage, the converter has a resonant frequency and comprising:
- first and second dc inputs;
- a transformer having primary and secondary windings with matched polarities;
- a controllable switch for switching power from said dc inputs through said primary winding of said transformer, said controllable switch and said primary winding of said transformer being coupled in series between said first and second dc voltage inputs;
- first and second dc voltage outputs;
- a rectifier coupled to said secondary winding of said transformer, said rectifier and said secondary winding of said transformer being coupled in series between said first and second dc voltage outputs;
- a smoothing capacitor having a first connection coupled to receive dc power from said rectifier at a first connection node, said first connection node being coupled to said first dc voltage output, said smoothing capacitor having a second connection coupled to said second dc voltage output; and
- a controller having an output coupled to said controllable switch and being configured to control said switch such that a voltage waveform on said secondary winding has a first portion during which said switch is on and current flows into said first connection node, and second portion during which said switch and said rectifier are both off; and
- wherein substantially no current flows into said first connection node during said second portion of said voltage waveform other than from said smoothing capacitor, wherein:
  - the forward converter is configured to limit a current in said switch during start-up of said forward converter, and to operate a control signal to said switch at an increased frequency during start-up relative to said resonant frequency to perform said current limiting,
  - wherein the forward converter is configured to invoke said increased frequency operation on the basis of a collector voltage of said switch or to select an oscillator to provide said increased frequency.

15. A controller as claimed in claim 14 wherein said switch comprises a transistor, and wherein said limiting comprises operating said transistor in a non-linear region.

16. A discontinuous resonant forward converter for converting an input dc voltage to an output dc voltage, the converter comprising:
- first and second dc inputs;
- a transformer having primary and secondary windings with matched polarities;
- a controllable switch for switching power from said dc inputs through said primary winding of said transformer, said controllable switch and said primary winding of said transformer being coupled in series between said first and second dc voltage inputs;
- first and second dc voltage outputs;
- a rectifier coupled to said secondary winding of said transformer, said rectifier and said secondary winding of said transformer being coupled in series between said first and second dc voltage outputs;
- a smoothing capacitor having a first connection coupled to receive dc power from said rectifier at a first connection node, said first connection node being coupled to said first dc voltage output, said smoothing capacitor having a second connection coupled to said second dc voltage output; and
- a controller having an output coupled to said controllable switch and being configured to control said switch such that a voltage waveform on said secondary winding has a first portion during which said switch is on and current flows into said first connection node, and second portion during which said switch and said rectifier are both off; and
- wherein substantially no current flows into said first connection node during said second portion of said voltage waveform other than from said smoothing capacitor,
the forward converter comprising:
- a detector to detect a current limit condition; and
- a frequency controller to increase a frequency of a control signal to said switch responsive to said detection, wherein said frequency controller is configured to invoke said frequency increasing on the basis of a collector voltage of said switch or to perform said frequency increasing by selecting an oscillator.

* * * * *